US012571240B2

(12) United States Patent
Ivey et al.

(10) Patent No.: US 12,571,240 B2
(45) Date of Patent: Mar. 10, 2026

(54) LOCK ADAPTER

(71) Applicant: DISH Wireless L.L.C., Englewood, CO (US)

(72) Inventors: Greg Ivey, Highlands Ranch, CO (US); Jerome A. LaPalme, Aurora, CO (US); Christopher Johnson, Parker, CO (US)

(73) Assignee: DISH Wireless L.L.C., Englewood, CO (US)

(*) Notice: Subject to any disclaimer, the term of this patent is extended or adjusted under 35 U.S.C. 154(b) by 120 days.

(21) Appl. No.: 18/124,722

(22) Filed: Mar. 22, 2023

(65) Prior Publication Data

US 2023/0304336 A1 Sep. 28, 2023

Related U.S. Application Data

(60) Provisional application No. 63/323,289, filed on Mar. 24, 2022.

(51) Int. Cl.

| | |
|---|---|
| ***E05C 19/18*** | (2006.01) |
| ***E05B 67/38*** | (2006.01) |
| ***E05C 19/08*** | (2006.01) |

(52) U.S. Cl.

CPC .......... *E05C 19/184* (2013.01); *E05B 67/383* (2013.01); *E05C 19/08* (2013.01)

(58) Field of Classification Search

CPC ................. E05B 67/383; E05B 67/063; E05B 2067/066; E05C 19/184; E05C 19/08; Y10T 292/31

USPC ............................................................ 70/51

See application file for complete search history.

(56) References Cited

U.S. PATENT DOCUMENTS

| | | | | |
|---|---|---|---|---|
| 388,394 A * | 8/1888 | Brown | E05C 19/08 | 292/281 |
| 656,860 A * | 8/1900 | Smith et al. | E05C 19/08 | 292/281 |
| 943,220 A * | 12/1909 | Dufour | B66C 1/34 | 24/598.5 |

(Continued)

FOREIGN PATENT DOCUMENTS

| | | | |
|---|---|---|---|
| DE | 371514 C * | 3/1923 | E05B 67/383 |
| GB | 816672 A * | 7/1959 | E05C 3/14 |

(Continued)

OTHER PUBLICATIONS

DE_371514_C Espacenet machine translation, claims and description (Year: 2024).*

*Primary Examiner* — Steven A Tullia

(74) *Attorney, Agent, or Firm* — Wash Park IP Ltd.; John T. Kennedy

(57) ABSTRACT

A lock adapter includes a first adapter arm and a second adapter arm. The first adapter arm has a first end which mating with a staple of a latch assembly, which, with a corresponding hasp, controls access to a structure. The first adapter arm also has second end configured for mating with the shackle of the lock. The second adapter arm also has a first end and a second end. The first end of the second adapter arm is configured for mating with the first end of the first adapter arm after the first end of the first adapter arm mates with the latch. The second end of the second adapter arm is configured for mating with the shackle of the lock. Upon the lock adapter mating with the staple and with the shackle of the lock, access to the structure via the latch assembly is inhibited.

20 Claims, 16 Drawing Sheets

(56) References Cited

U.S. PATENT DOCUMENTS

| | | | | | |
|---|---|---|---|---|---|
| 1,376,221 | A * | 4/1921 | Nordin | B60R 25/005 70/200 |
| 2,035,216 | A * | 3/1936 | Beauchamp | E05B 83/02 292/281 |
| 2,536,352 | A * | 1/1951 | Butcher | E05B 67/383 292/148 |
| 2,560,624 | A * | 7/1951 | Bartlett | E05B 67/383 70/57 |
| 2,963,895 | A * | 12/1960 | Thomas | E05B 67/383 292/288 |
| 3,596,965 | A * | 8/1971 | Woofter | A47G 21/10 294/7 |
| 3,667,259 | A * | 6/1972 | Reque | E05B 67/383 292/288 |
| 3,678,717 | A * | 7/1972 | Eaton | F16L 35/00 285/80 |
| 4,065,833 | A * | 1/1978 | Bender | F16B 45/035 24/598.5 |
| 4,085,599 | A * | 4/1978 | Fischer | E05B 67/383 70/14 |
| 4,587,814 | A * | 5/1986 | Wilson | F16L 35/00 70/164 |
| 4,732,018 | A * | 3/1988 | Crosby | B60R 25/08 70/237 |
| 4,756,504 | A * | 7/1988 | Chamberlain | F16M 13/02 248/302 |
| 4,823,792 | A * | 4/1989 | Dulebohn | A61B 17/2812 606/208 |
| 4,864,834 | A * | 9/1989 | Waite | E05B 67/383 70/57 |
| 4,897,515 | A * | 1/1990 | Zubar | H01H 9/283 200/43.14 |
| 5,167,135 | A * | 12/1992 | Gobeski | E05B 67/383 200/43.15 |
| 5,365,757 | A * | 11/1994 | Primeau | E05B 67/383 292/307 R |
| 5,743,116 | A * | 4/1998 | Suster | E05B 67/383 70/14 |
| 6,092,402 | A * | 7/2000 | Porcelli | A63C 11/005 70/58 |
| 6,138,972 | A * | 10/2000 | Votruba | B60P 7/08 248/552 |
| 8,276,411 | B2 * | 10/2012 | Thomas, II | E05C 19/004 70/262 |
| 8,297,090 | B2 * | 10/2012 | Fong | E05B 67/383 411/910 |
| 8,353,182 | B2 * | 1/2013 | Triffle | E05B 67/383 70/14 |
| 8,408,609 | B2 * | 4/2013 | Brojanac | E05B 67/383 292/307 R |
| 10,280,651 | B1 * | 5/2019 | Hodge | F16B 45/06 |
| 10,415,272 | B1 * | 9/2019 | Tuttle | E05B 67/383 |
| 11,773,627 | B2 * | 10/2023 | Ancheta | E05B 67/383 70/52 |
| 2004/0250576 | A1 * | 12/2004 | Flanders, Jr. | E05B 67/383 70/230 |
| 2007/0039806 | A1 * | 2/2007 | Puddicombe, II | H01H 27/002 200/43.04 |
| 2018/0238079 | A1 * | 8/2018 | Burnette | E05B 67/383 |
| 2023/0157424 | A1 * | 5/2023 | Allison | E05B 65/52 70/74 |

FOREIGN PATENT DOCUMENTS

| | | | | |
|---|---|---|---|---|
| GB | 1563105 | A * | 3/1980 | E05B 67/383 |
| GB | 2125094 | A * | 2/1984 | E05B 67/383 |
| GB | 2126180 | A * | 3/1984 | E05B 67/383 |
| GB | 2625833 | A * | 7/2024 | E05B 63/0056 |
| WO | WO-2009143214 | A1 * | 11/2009 | E05B 67/383 |
| WO | WO-2015071146 | A1 * | 5/2015 | E05B 67/383 |

* cited by examiner

SECTION 2D-2D

SECTION 3D-3D

SECTION 6D-6D

LOCK ADAPTER

CROSS REFERENCE TO RELATED APPLICATIONS

This application claims the benefit of priority pursuant to 35 U.S.C. § 119(e) of U.S. provisional application No. 63/323,289 filed 24 Mar. 2022 entitled "Lock adapter," the contents of which are hereby incorporated herein by reference in its entirety.

TECHNICAL FIELD

The subject matter described herein relates to devices, systems, and methods for coupling a lock to a structure.

BACKGROUND

Various forms of structures such as doors, cabinets, boxes, rooms, containers, or the like are commonly secured using a removable locking mechanism (herein a "padlock"). As used herein, a padlock is a lock that is not physically integrated with a structure, or part thereof, to be secured and is provided separately. A padlock, as distinguished from a built-in lock, may be used with multiple different structures, but with one structure at any given time. Non-limiting examples of padlocks include those manufactured under the MASTER LOCK™ brand by Master Lock Company LLC, of Oak Creek, Wisconsin, USA.

A padlock commonly includes a shackle that is secured in a lock body by one or more internal locking members. The locking members typically engage with corresponding notches in the shackle to prevent axial withdrawal of the shackle from the lock body. The internal locking members may be mechanically released by one of several common mechanisms, for example, pin or disk tumblers released by a key or combination locks (e.g., with a single rotating dial or multiple rotating thumbwheels). In some padlock designs, various electronic control mechanisms are used, in addition to the mechanical locking members, to inhibit unauthorized withdrawal of the shackle from the lock body. Non-limiting examples of such electronic control mechanisms include electronic keypads that actuate lock releases and wireless control systems that receive release signals via a communication protocol e.g., Bluetooth® or near field communication (NFC).

A shackle is typically constructed of a hardened metal, a hardened metal alloy, or a composition thereof, such as a boron alloy, hardened steel, or the like. A shackle also commonly may be provided in various lengths, widths, diameters, and materials. Materials may include boron alloys, hardened steel, and the like. Lock bodies are also commonly provided in various lengths, widths, diameters, and materials.

Often a structure includes a latch assembly or similar mechanism configured for use with a padlock to secure the structure. The latch assembly commonly includes a latch eye into which a shackle can be inserted to secure the structure. The latch assembly may commonly be provided in various sizes, with differing eye dimensions, numerous assembly configurations, and the like.

For some implementations, a latch assembly may be configured, relative to other structural members of a given structure, such that the use of a given padlock with the given latch assembly may be inhibited by the one or more other structural members. For example, a structural wall member may be too close to a latch eye of a given latch assembly to permit use of a given padlock, such as a padlock having a shackle or lock body with given dimensions, characteristics, or otherwise.

SUMMARY

In accordance with at least one implementation of the present disclosure, a lock adapter for a lock with a shackle includes the following: a first adapter arm having a first end and a second end; wherein the first end of the first adapter arm is configured for mating with a staple of a latch assembly; wherein the latch assembly includes corresponding hasp configured for use in controlling access to at least a portion of a structure; and wherein the second end of the first adapter arm is configured for mating with the shackle of the lock; and a second adapter arm having a first end and a second end; wherein the first end of the second adapter arm is configured for mating with the first end of the first adapter arm after the first end of the first adapter arm mates with the latch; and wherein the second end of the second adapter arm is configured for mating with the shackle of the lock; and wherein upon the lock adapter mating with the staple and with the shackle of the lock, access to the structure via the latch assembly is inhibited.

In accordance with another implementation of the lock adapter, the second end of the first adapter arm defines an aperture sized to receive the shackle of the lock therethrough.

In accordance with another implementation of the lock adapter, the second end of the second adapter arm defines an aperture sized to receive the shackle of the lock therethrough.

In accordance with another implementation of the lock adapter, the first end of the first adapter arm is sized and formed to extend through an eye defined within the staple of the latch assembly; and the first end of the first adapter arm defines an aperture configured to receive the first end of the second adapter arm therethrough after the first end of the first adapter arm extends through the eye of the staple.

In accordance with another implementation of the lock adapter, the first adapter arm extends along a first longitudinal axis from the first end to the second end and is planar with respect to a second axis.

In accordance with another implementation of the lock adapter, the first adapter arm extends along a first longitudinal axis from the first end to the second end and bends at a vertex between the first end and the second end with respect to a second axis.

In accordance with another implementation of the lock adapter, the first adapter arm extends along a first longitudinal axis from the first end to the second end and is planar with respect to a second axis; and the second adapter arm defines a first bend, at a first vertex between the first end of the second adapter arm and the second end of the adapter arm, that allows the second adapter arm to nest around the staple.

In accordance with another implementation of the lock adapter, the second adapter arm defines a second bend at a second vertex between the first vertex and a distal portion of the first end of the second adapter arm.

In accordance with another implementation of the lock adapter, the second end of the second adapter arm lies within a first plane; and the distal portion of the first end of the second adapter arm lies within a second plane parallel to, but spaced apart from, the first plane.

In accordance with another implementation of the lock adapter, the first end of the second adapter arm defines a latch finger portion with a smaller cross-sectional area than a central portion of the second adapter arm extending between the first end of the second adapter arm and the second end of the second adapter arm.

In accordance with another implementation of the lock adapter, the second end of the first adapter arm defines a first shackle aperture sized to receive the shackle of the lock therethrough; and the second end of the second adapter arm defines a second shackle aperture sized to receive the shackle of the lock therethrough.

In accordance with another implementation of the lock adapter, the first adapter arm and the second adapter arm are of unitarily formed of a hardened metal alloy.

In accordance with another implementation of the lock adapter, the first end of the first adapter arm is sized and formed to extend through an eye defined within the staple of the latch assembly; and the first end of the second adapter arm defines an aperture configured to receive the first end of the first adapter arm therethrough after the first end of the first adapter arm extends through the eye of the staple.

In accordance with another implementation of the lock adapter, the first adapter arm extends along a first longitudinal axis from the first end to the second end and bends at a first vertex between the first end of the first adapter arm and the second end of the first adapter arm with respect to a second axis; and the second adapter arm defines a first bend at a second vertex located between the first end of the second adapter arm and the second end of the adapter arm such that the bend allows the second adapter arm to nest around the staple.

In accordance with another implementation of the lock adapter, the second adapter arm defines a second bend at a third vertex located between the second vertex and the second end of the second adapter arm; and corresponding interior angles opposite the first vertex and the third vertex are congruent such that the second end of the second adapter arm is configured to sit flush against the second end of the first adapter arm when the second end of the first adapter arm and the second end of the second adapter arm mate with the shackle of the lock.

In accordance with another implementation of the lock adapter, the second adapter arm defines a third bend at a fourth vertex located between the second vertex and a distal portion of the first end of the second adapter arm.

In accordance with another implementation of the lock adapter, the aperture defined in the first end of the second adapter arm is located in the distal portion of the first end of the second adapter arm.

In accordance with another implementation of the lock adapter, the second end of the first adapter arm defines a first shackle aperture sized to receive the shackle of the lock therethrough; and the second end of the second adapter arm defines a second shackle aperture sized to receive the shackle of the lock therethrough.

In accordance with another implementation of the lock adapter, the first adapter arm and the second adapter arm are of unitarily formed of a hardened metal alloy.

In accordance with implementation of the present disclosure, a process for securing a structure having a latch assembly mounted thereon with a lock adapter includes the following: first inserting a first end of a first adapter arm of the lock adapter through an eye of a staple of the latch assembly such that a distal portion of the first end of the first adapter arm extends beyond the e beyond the eye of the staple; engaging a first end of a second adapter arm of the lock adapter with the distal portion of the first end the first adapter arm; nesting a second engagement arm about the staple and mating a second end of the second adapter arm against a second end of the first adapter arm; second inserting a first end of a shackle of a padlock through a first aperture defined within the second end of the first adapter arm and through a second aperture defined within the second end of the second adapter arm; and third inserting the first end of the shackle into a body of the padlock.

BRIEF DESCRIPTION OF THE DRAWINGS

The disclosure will be readily understood by the following detailed description in conjunction with the accompanying drawings. In some instances, like reference numerals designate like structural elements.

The use of cross-hatching in the accompanying figures is generally provided to indicate a surface of a cross-section cut. The use of contour lines, shading, or stippling in the accompanying figures is generally provided indicate surface features, including curved surfaces or changes in depth, to clarify boundaries between adjacent elements, and to facilitate legibility of the figures. Accordingly, neither the presence nor the absence of cross-hatching, contour lines, shading, or stippling conveys or indicates any preference or requirement for particular materials, material properties, element proportions, element dimensions, commonalities of similarly illustrated elements, or any other characteristic, attribute, or property for any element illustrated in the accompanying figures.

Additionally, the proportions and dimensions (either relative or absolute) of the various features and elements (and collections and groupings thereof) and the boundaries, separations, and positional relationships presented therebetween, are provided in the accompanying figures merely to facilitate an understanding of the various non-limiting implementations described herein and, accordingly, may not be presented or illustrated to scale, and do not indicate any preference or requirement for an illustrated implementation to the exclusion of other implementations described with reference thereto.

Figure 1B:
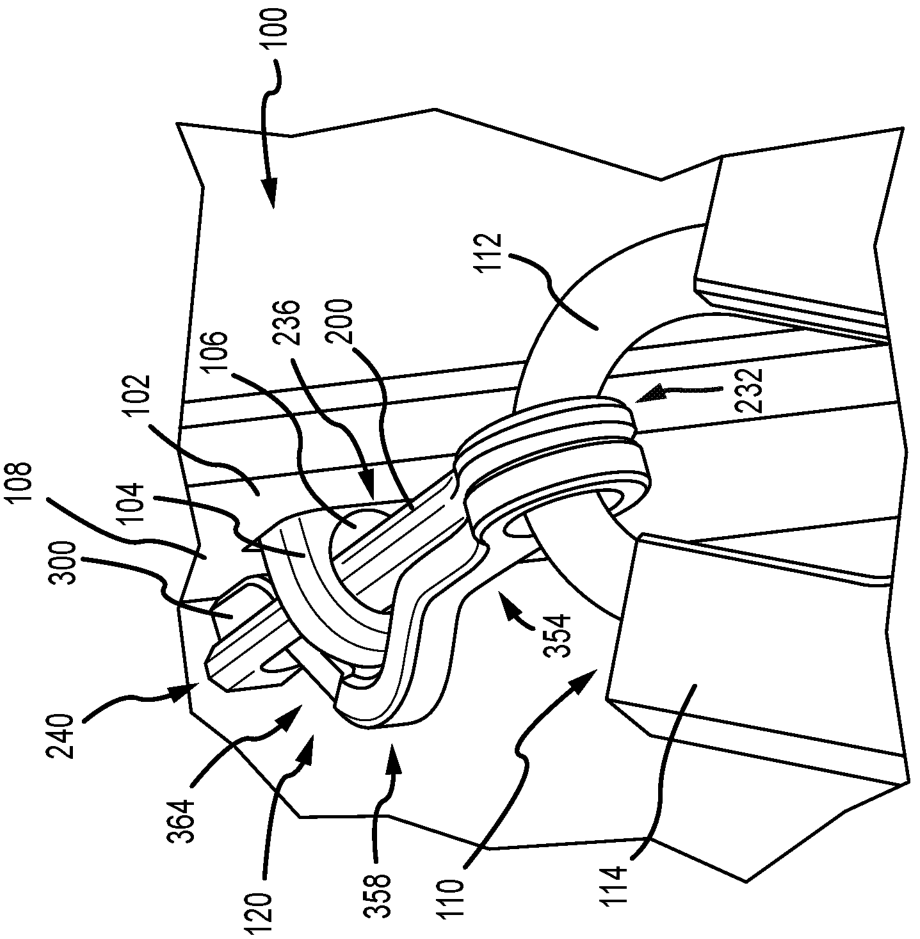
Figure 1A:
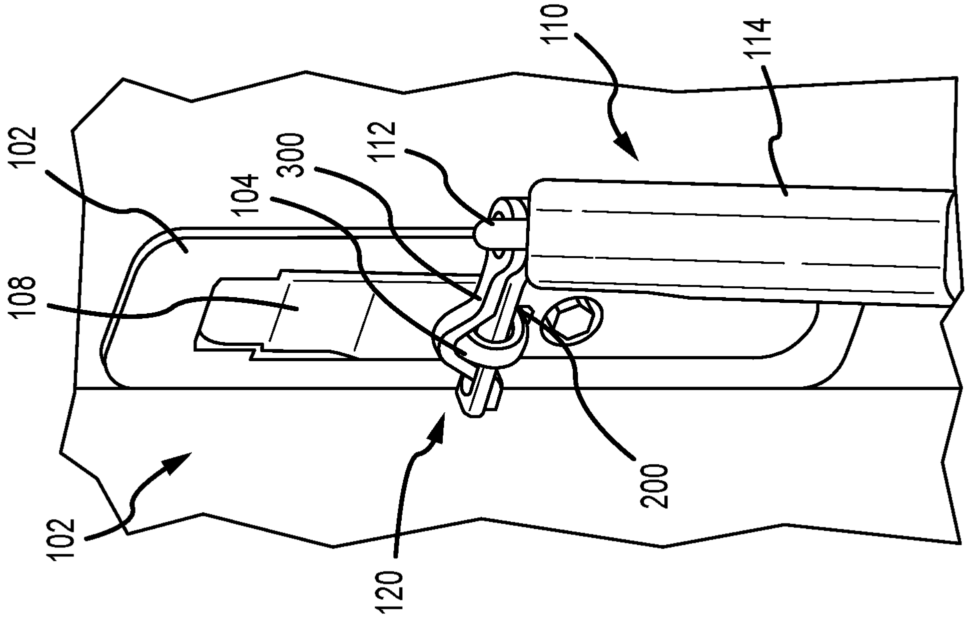

FIG. 1A is an isometric view of a first example implementation of a lock adapter in a first configuration aiding in locking a latch with a padlock.

FIG. 1B is an isometric view of the first example implementation of the lock adapter of FIG. 1A in a second configuration aiding in locking a latch with a padlock.

Figure 1C:
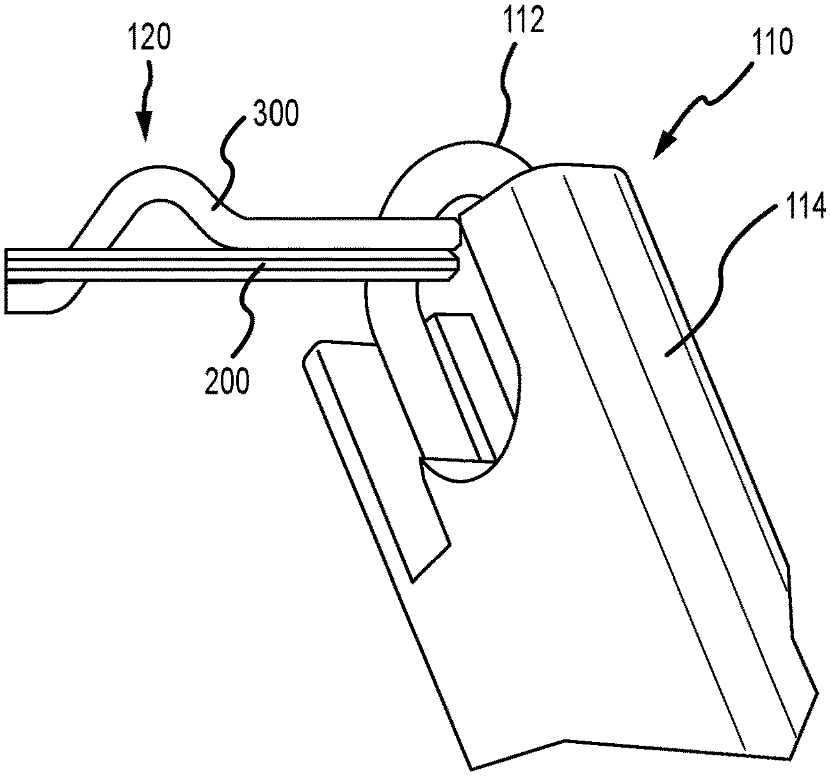

FIG. 1C is an isometric view of the first example implementation of the lock adapter of FIG. 1A attached to a padlock.

Figure 1D:
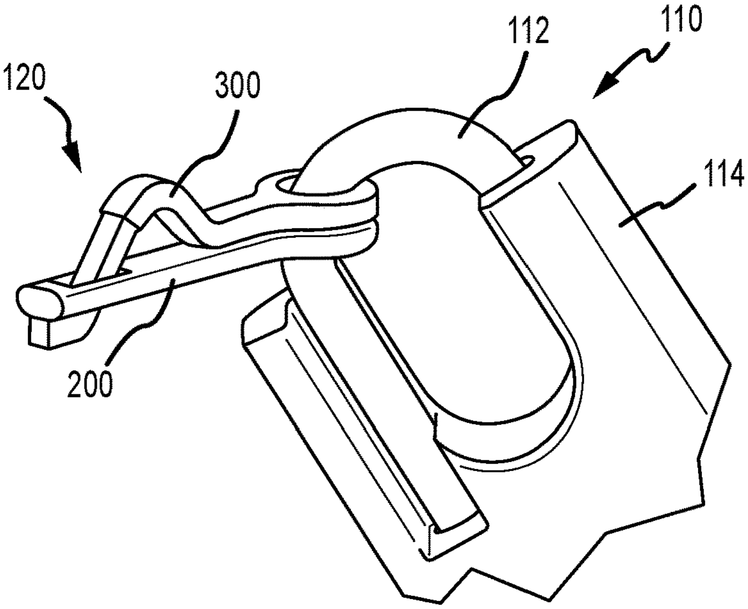

FIG. 1D is an alternate isometric view of the first example implementation of the lock adapter of FIG. 1A attached to a padlock.

Figure 2A:
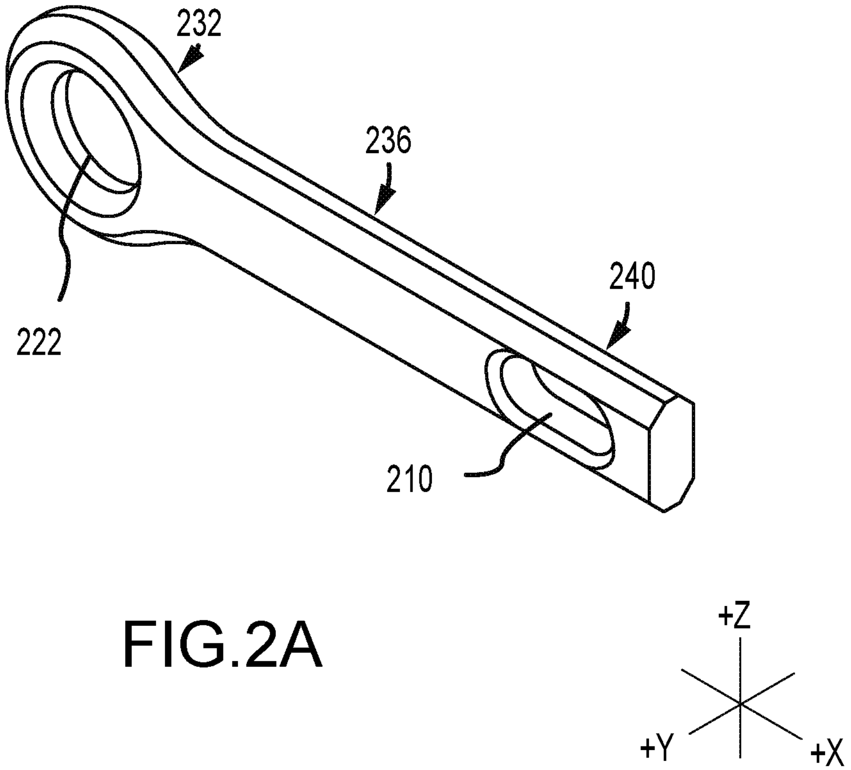

FIG. 2A is a top, front, right-side isometric view of a first adapter arm of the lock adapter of FIG. 1A.

Figure 2E:
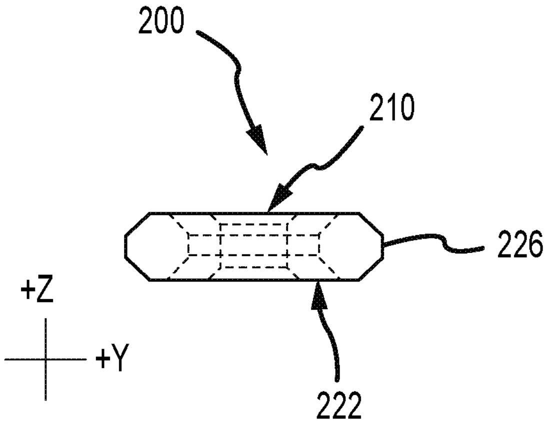
Figure 2B:
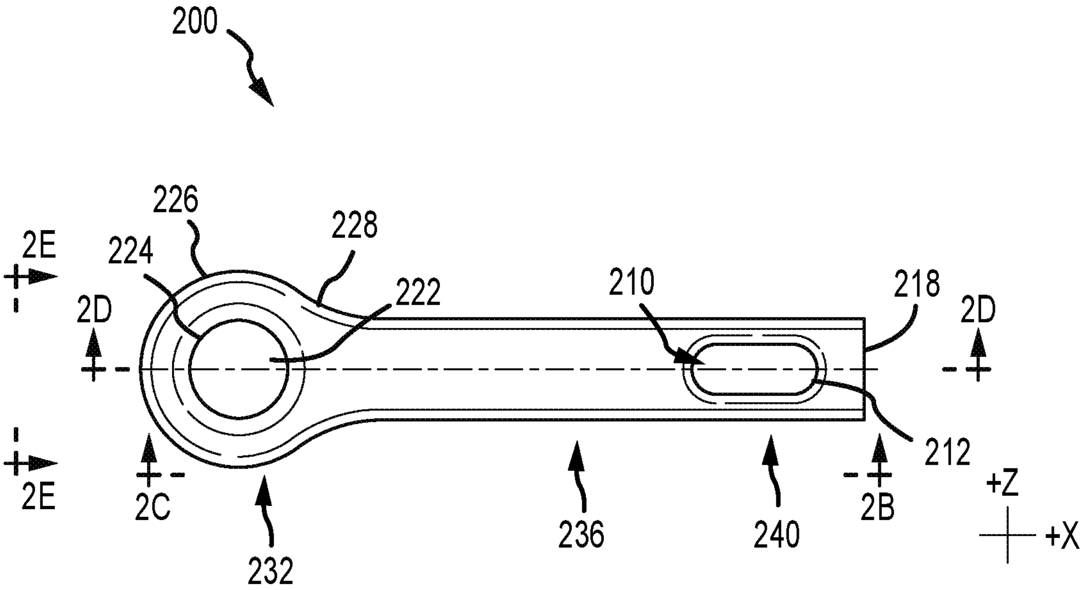

FIG. 2B is front elevation view of the first adapter arm of the lock adapter of FIG. 1A.

Figure 2C:
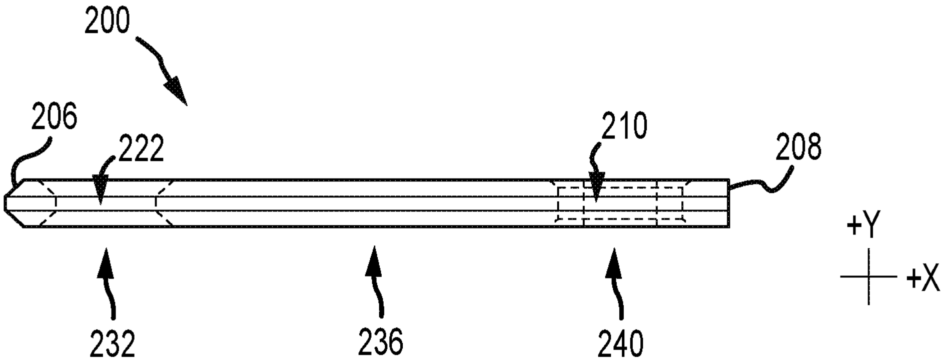

FIG. 2C is a bottom plan view of the first adapter arm of the lock adapter of FIG. 1A.

Figure 2D:
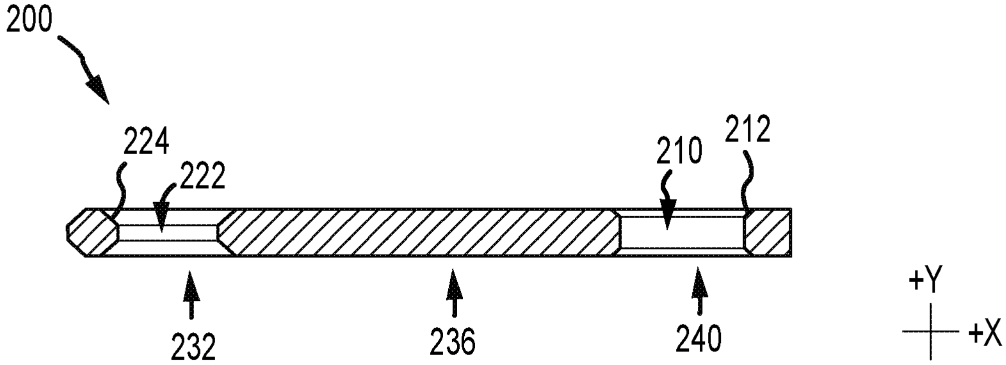

FIG. 2D is a bottom plan view in cross section along line 2D-2D as indicated in FIG. 2B of the first adapter arm of the lock adapter of FIG. 1A.

FIG. 2E is a left-side elevation view, rotated 90 degrees, of the first adapter arm of the lock adapter of FIG. 1A.

Figure 3A:
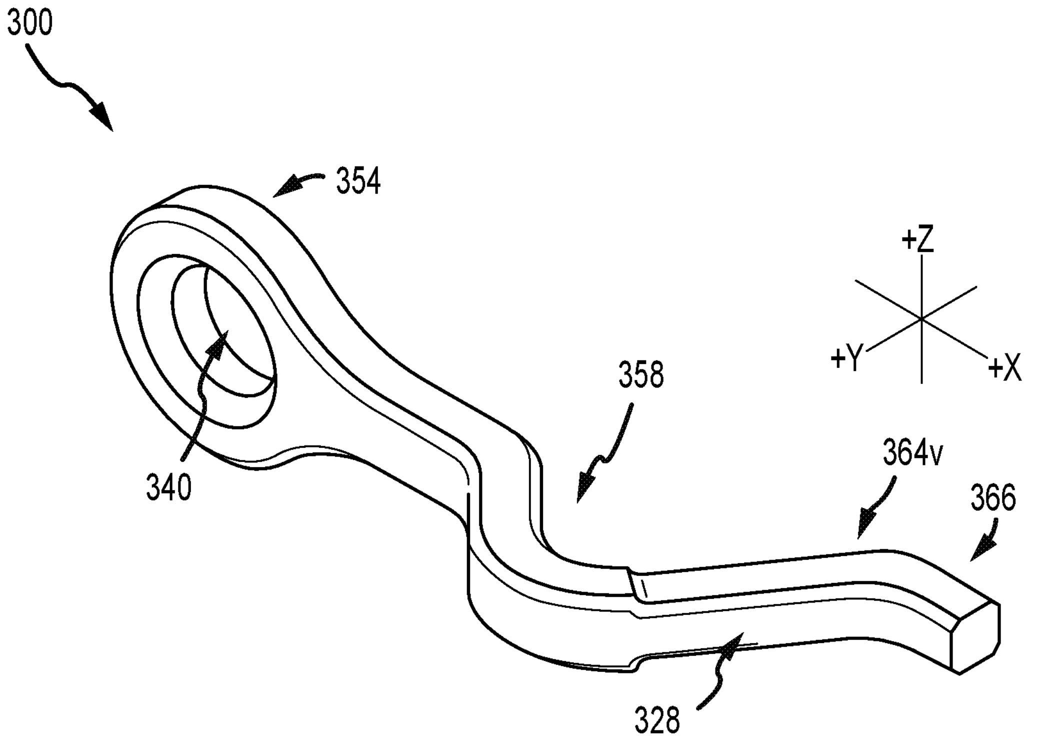

FIG. 3A is a top, front, right-side isometric view of a second adapter arm of the lock adapter of FIG. 1A.

Figure 3B:
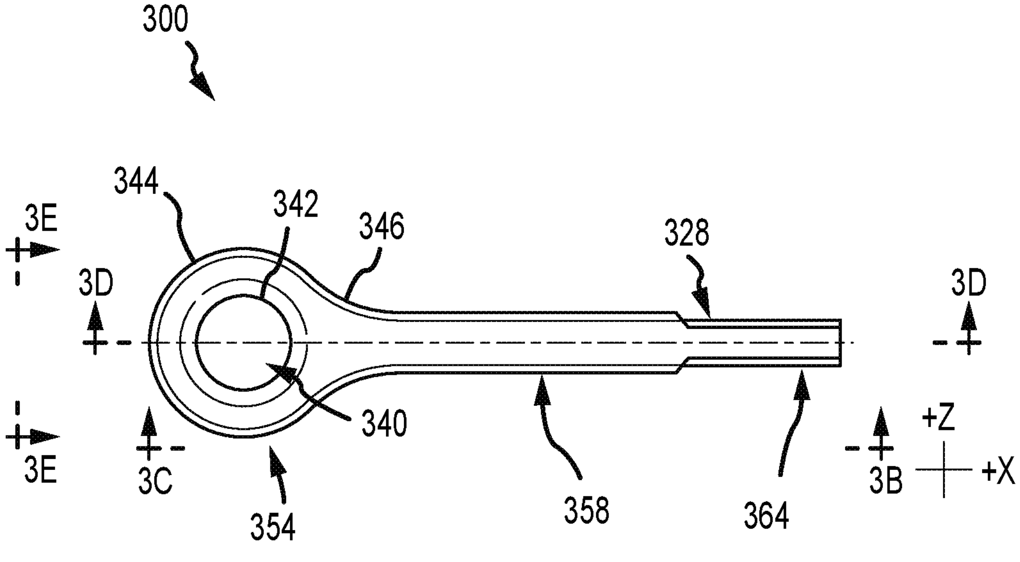

FIG. 3B is front elevation view of the second adapter arm of the lock adapter of FIG. 1A.

Figure 3C:
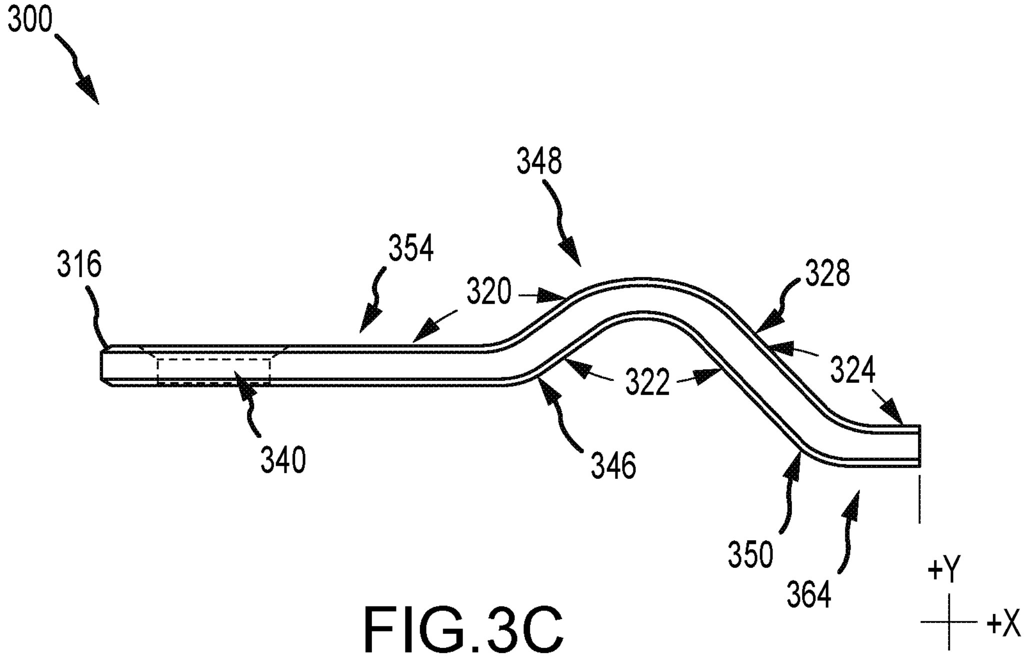

FIG. 3C is a bottom plan view of the second adapter arm of the lock adapter of FIG. 1A.

Figure 3D:
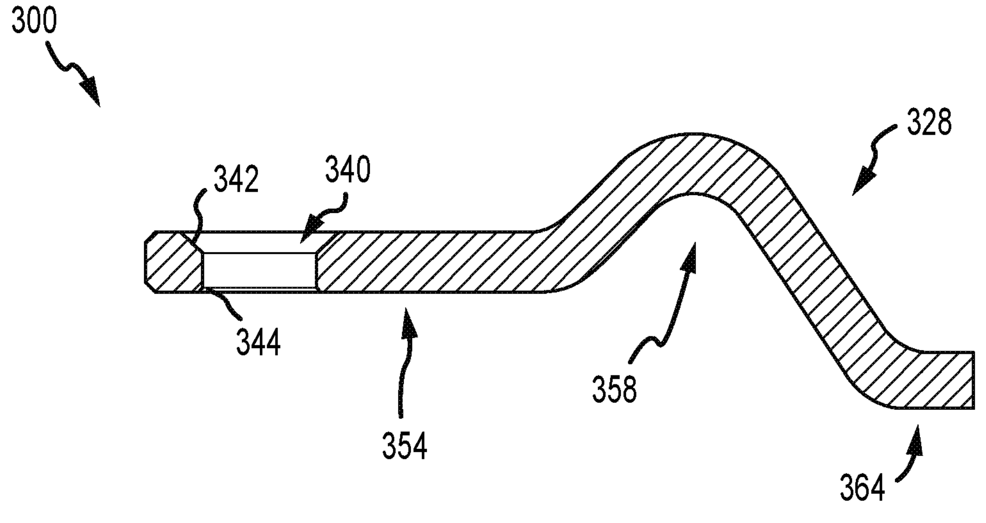

FIG. 3D is a bottom plan view, in cross section along line 3D-3D as indicated in FIG. 3B, of the second adapter arm of the lock adapter of FIG. 1A.

Figure 3E:
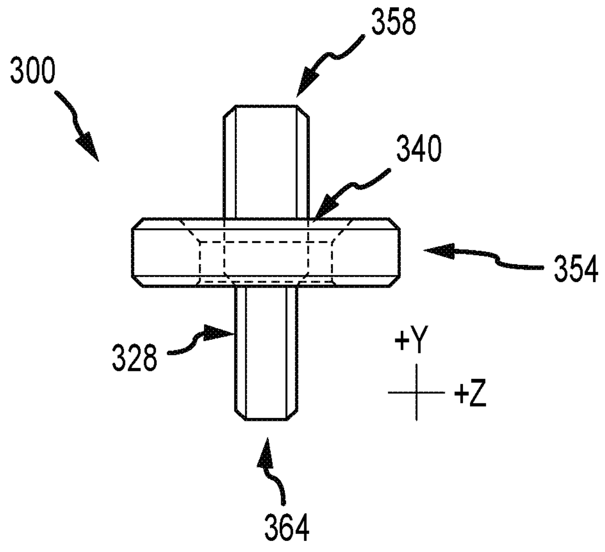

FIG. 3E is a left-side elevation view, rotated 90 degrees counterclockwise, of the second adapter arm of the lock adapter of FIG. 1A.

Figure 4B:
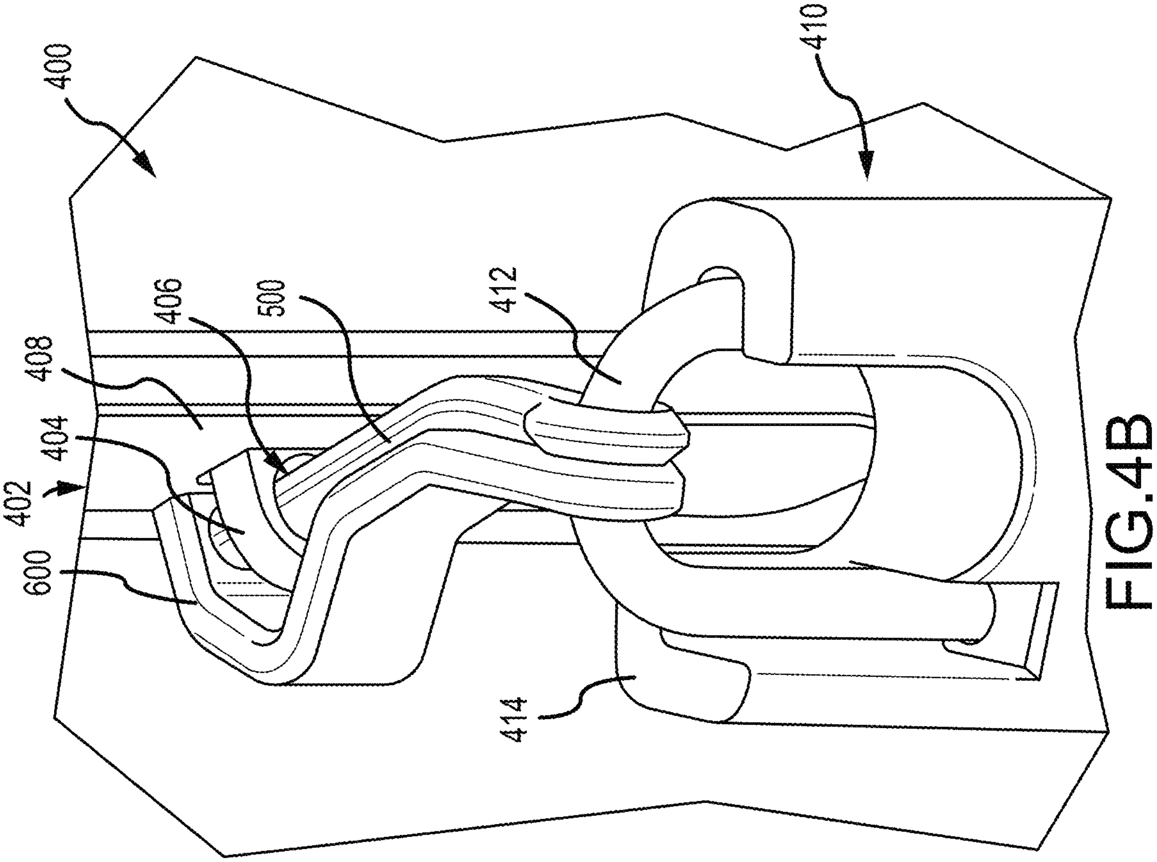
Figure 4A:
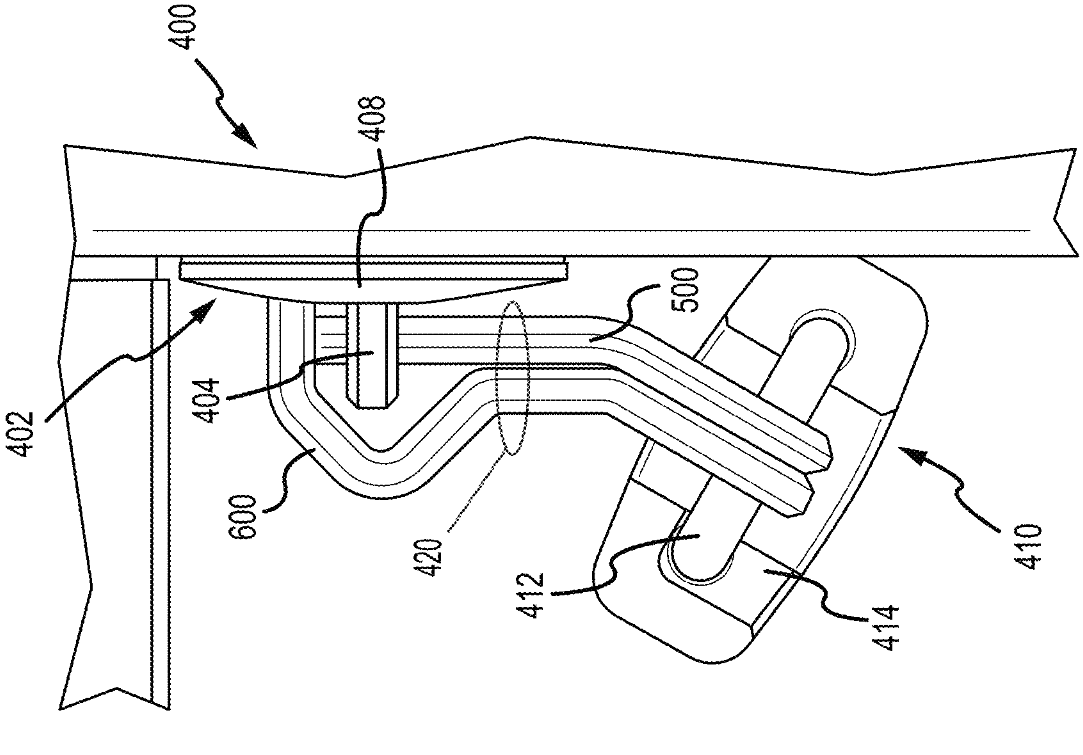

FIG. 4A is a top plan view of a second example implementation of a lock adapter aiding in locking a latch with a padlock.

FIG. 4B is an isometric view of the second example implementation of the lock adapter of FIG. 4A aiding in locking a latch with a padlock.

Figure 4C:
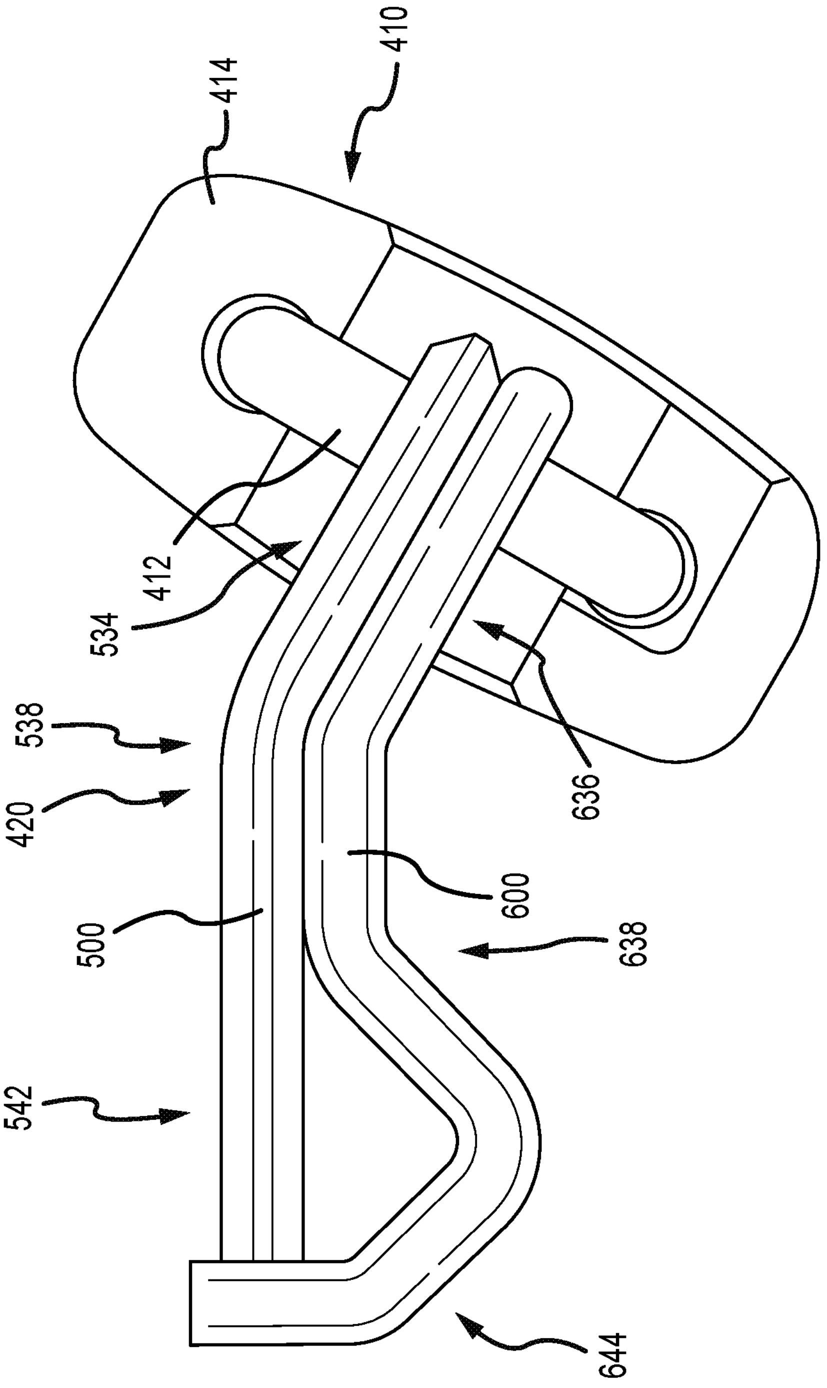

FIG. 4C is a top plan view of the second example implementation of the lock adapter of FIG. 4A attached to a padlock.

Figure 4D:
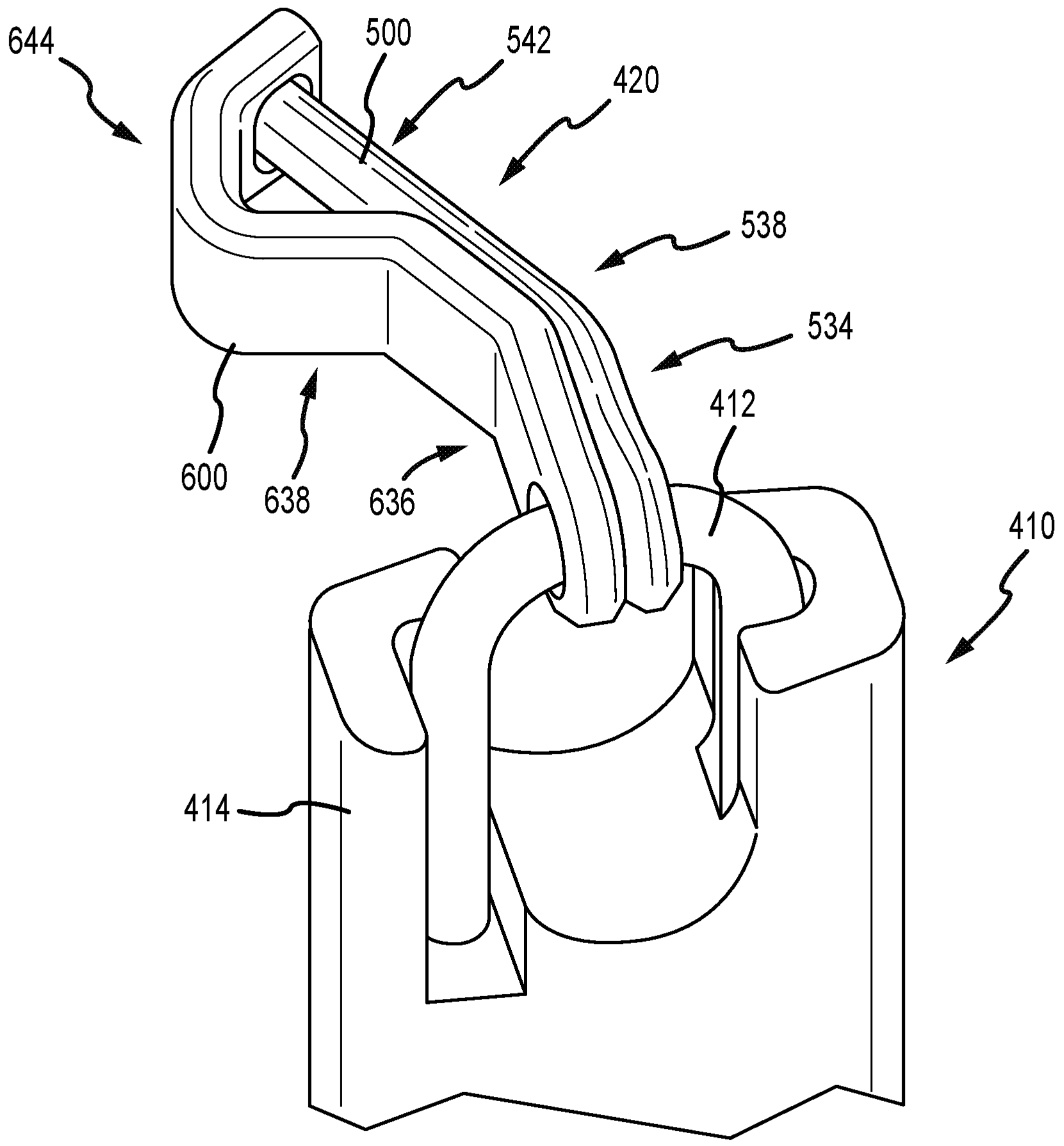

FIG. 4D is an isometric view of the second example implementation of the lock adapter of FIG. 4A attached to a padlock.

Figure 5A:
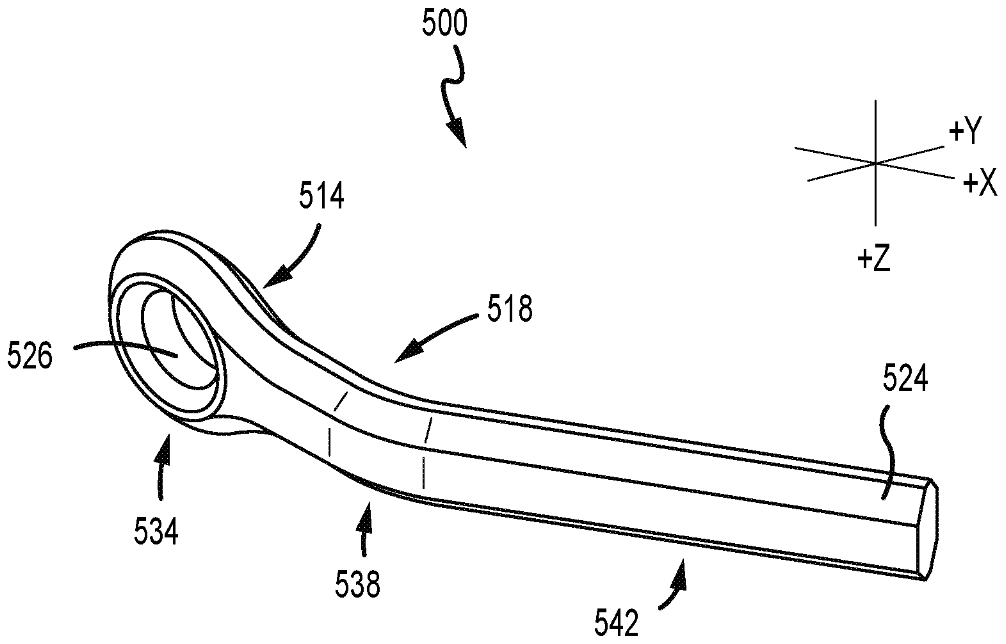

FIG. 5A is a bottom, rear isometric view of a first adapter arm of the lock adapter of FIG. 4A.

Figure 5E:
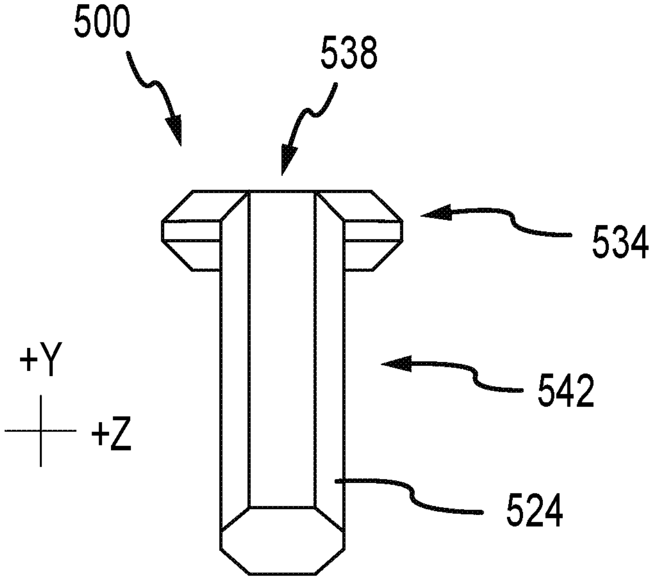
Figure 5B:
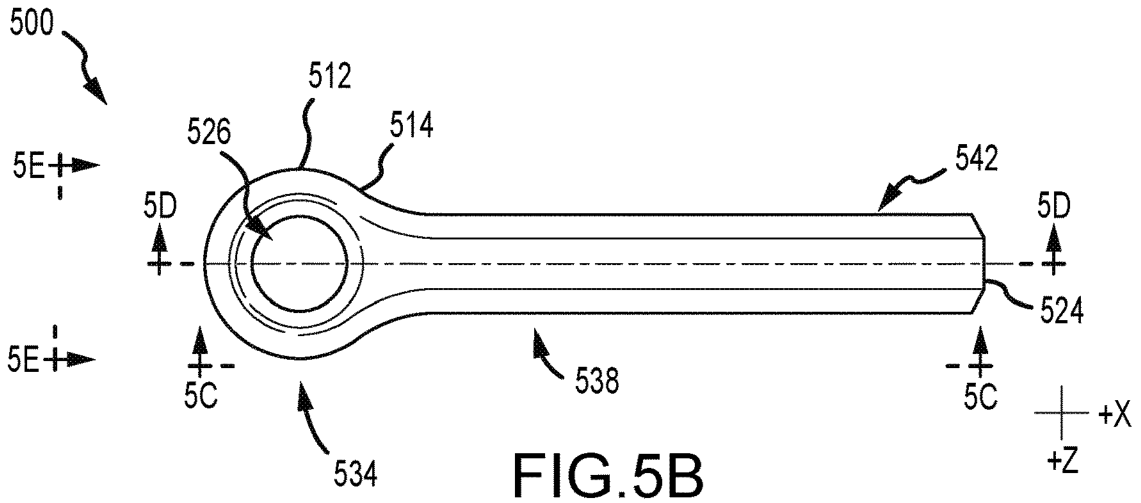

FIG. 5B is rear elevation view of the first adapter arm of the lock adapter of FIG. 4A.

Figure 5C:
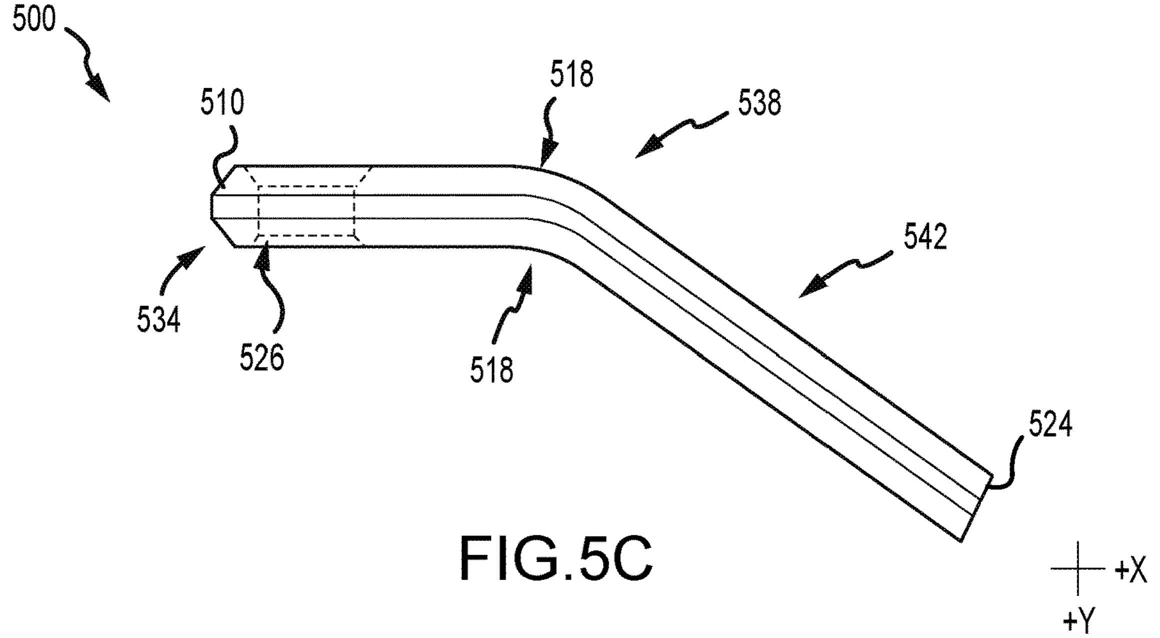

FIG. 5C is a top plan view of the first adapter arm of the lock adapter of FIG. 4A.

Figure 5D:
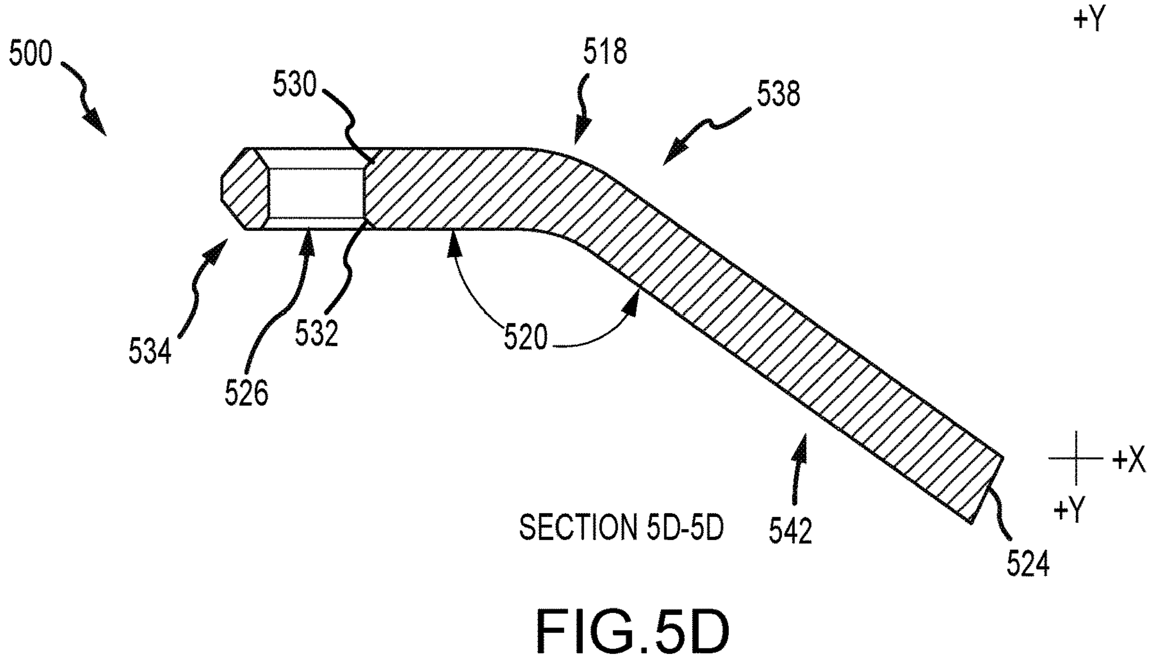

FIG. 5D is a top plan view in cross section along line 5D-5D as indicated in FIG. 5B of the first adapter arm of the lock adapter of FIG. 4A.

FIG. 5E is a right-side elevation view, rotated 90 degrees clockwise, of the first adapter arm for the lock adapter of FIG. 4A.

Figure 6A:
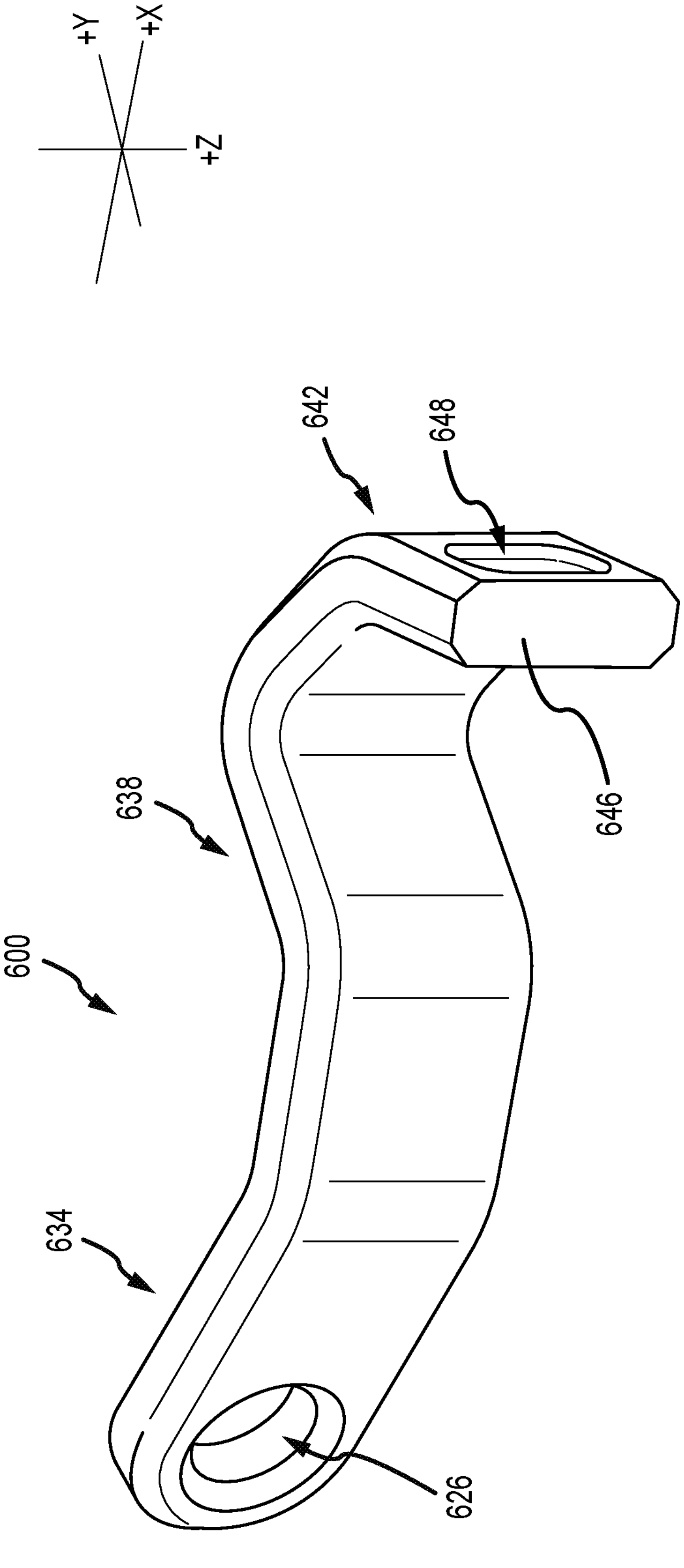

FIG. 6A is a bottom, rear isometric view of a second adapter arm of the lock adapter of FIG. 4A.

Figure 6B:
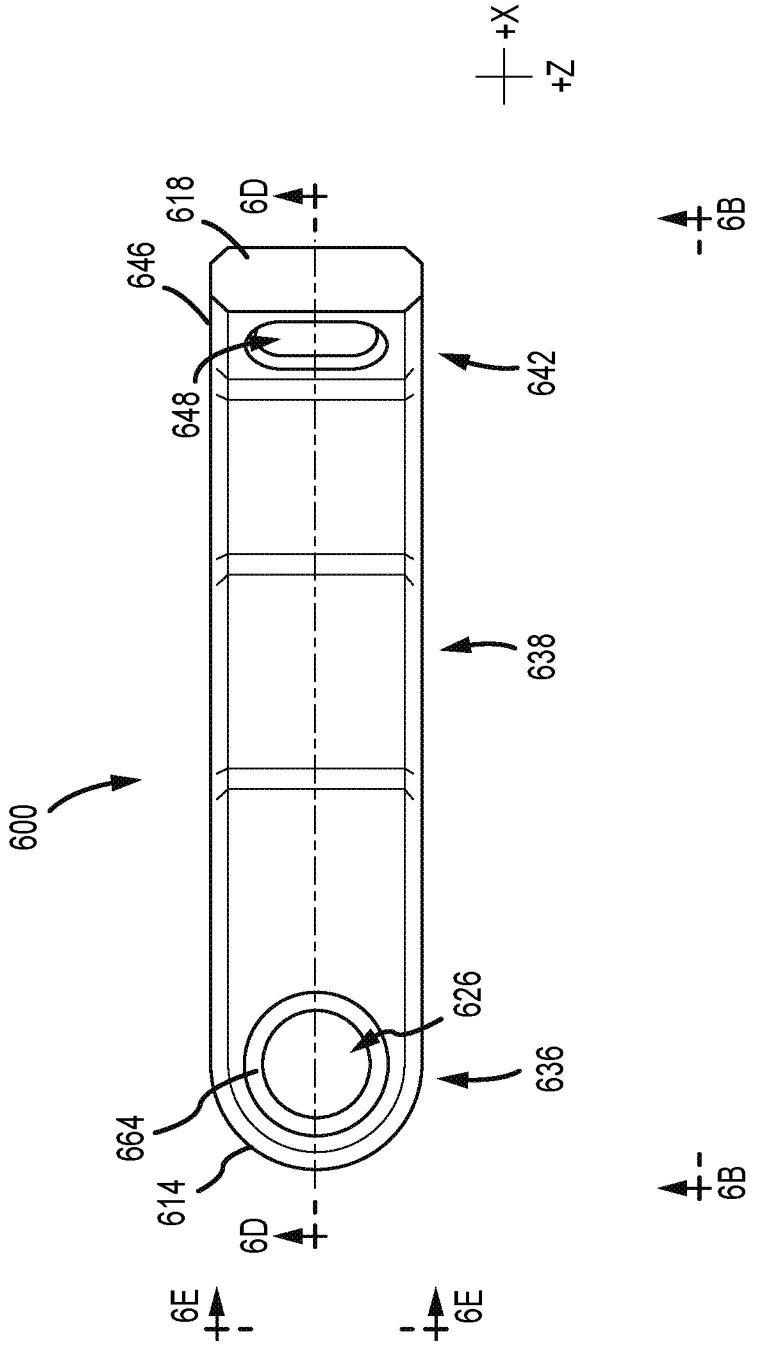

FIG. 6B is rear elevation view of the second adapter arm for the lock adapter of FIG. 4A.

Figure 6C:
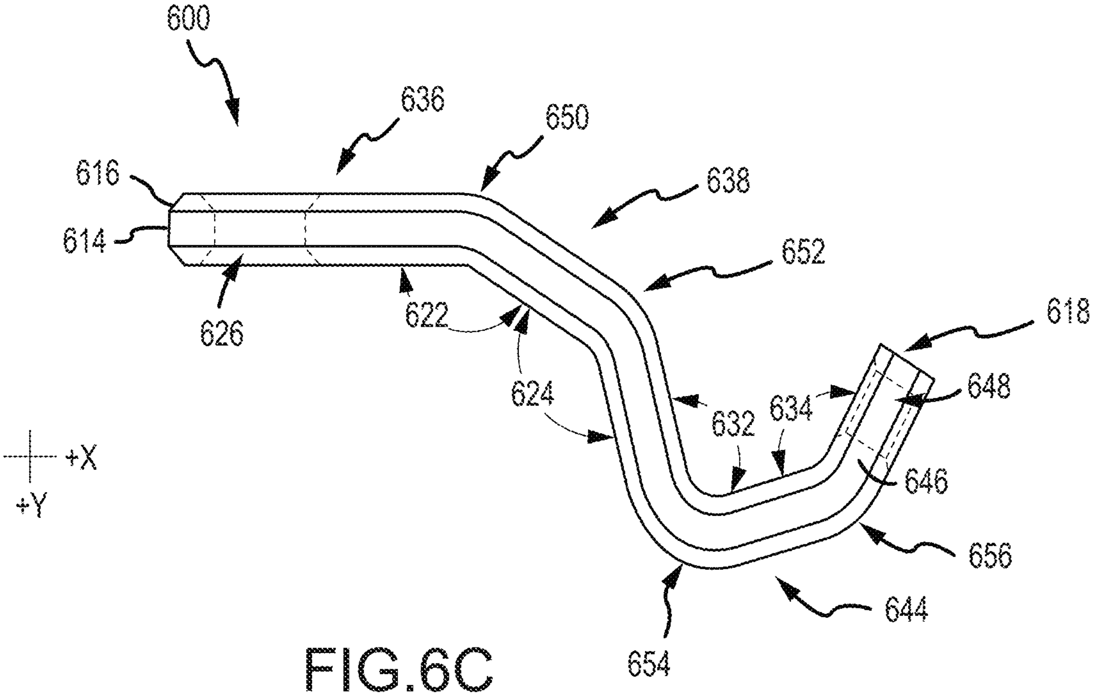

FIG. 6C is a top plan view of the second adapter arm for the lock adapter of FIG. 4A.

Figure 6D:
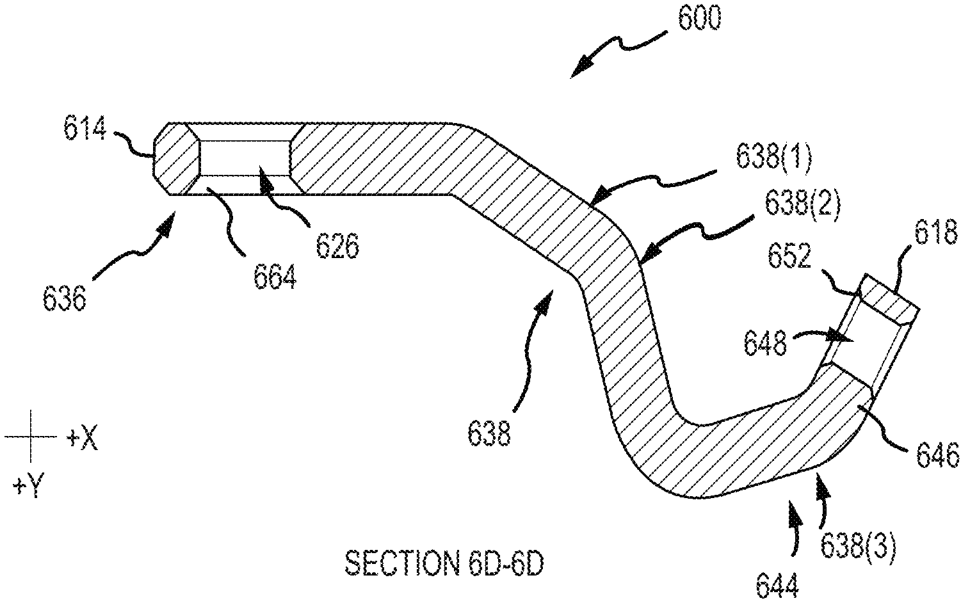

FIG. 6D is a top plan view, in cross section along line 6D-6D as indicated in FIG. 6B, of the second adapter arm for the lock adapter of FIG. 4A.

Figure 6E:
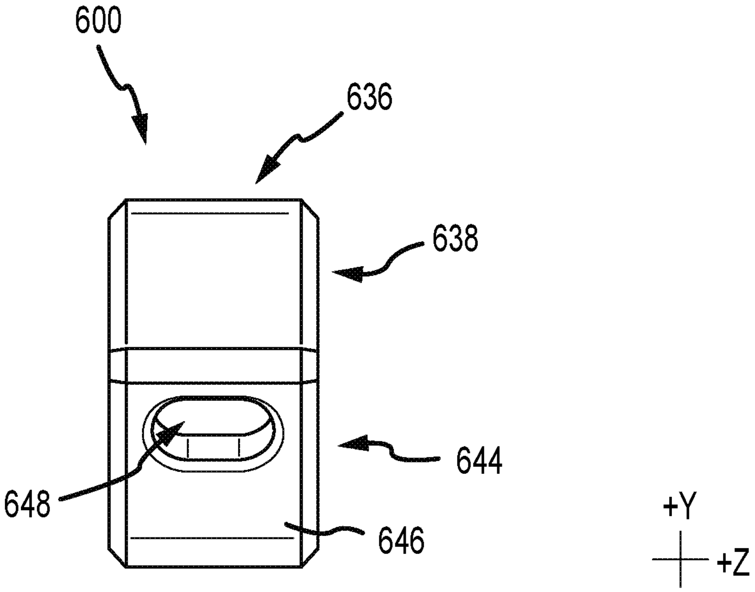

FIG. 6E is a right-side elevation view, rotated 90 degrees counterclockwise, of the second adapter arm for the lock adapter of FIG. 4A.

DETAILED DESCRIPTION

In some situations, members and components of a given structure may be configured, relative to latch assemblies mounted thereon to secure an access point (e.g., a door or a gate) such that the use of a given padlock with the given latch assembly may be inhibited by the one or more other structural members. For example, a structural wall member may be too close to a staple protruding from the hasp of a latch assembly to permit use of a given padlock, such as a padlock having a lock body with given dimensions, characteristics, or otherwise. In other situations, the diameter of the eye opening of a staple may be too small to receive a shackle of a given padlock with a larger diameter. Accordingly, embodiments of lock adapters are disclosed herein for facilitating use of a given padlock with a given latch assembly even when structural members of a structure, or aspects of the padlock itself, preclude use of the given padlock with the given latch assembly.

Various, non-limiting implementations of lock adapters are disclosed herein. A lock adapter may include two adapter arm components that are configured for mating with each other, with a latch assembly including a fixed shackle loop or staple (hereinafter collectively referred to as a "staple") and a hasp, and with a padlock shackle to secure a structure. The lock adapter may facilitate use of a given padlock with a given latch assembly without modification to the latch assembly, padlock, or structure. In example implementations, a lock adapter may include a first adapter arm and a second adapter arm. The first adapter arm is configured for insertion into an eye of a staple. When so inserted, the first adapter arm inhibits movement of the hasp with respect to the staple and thereby opening of the structure. By preventing movement of the hasp latch, the structure on which the latch assembly is mounted may be secured.

The first adapter arm and the second adapter arm may be further configured, at respective distal portions thereof, for mating with each other. The first adapter arm and the second adapter arm may be further configured, at respective proximal portions, for receiving a shackle of a padlock. The adapter arms may also define a center portion connecting the distal portion with the proximal portion. The distal, center, and proximal portions of a given adapter arm may have any length, width, depth, or configuration, or be made of the same or different materials, or otherwise. The center portion of a given adapter arm may or may not coincide with a longitudinal center of the adapter arm.

For at least one non-limiting implementation, a distal portion of the first adapter arm and a distal portion of the second adapter arm may have different form factors, which are configured to interface and interlock with each other. The distal portion of the first adapter arm is further configured to interface with an eye of a staple in the latch assembly (as further described below). In some implementations, the first lock adapter arm may mate with the latch assembly by insertion of the distal portion of the first adapter arm into and through the eye of the staple until the center portion of the first adapter arm is adjacent to or abuts one side of the staple. Further, during use, a center portion of the second adapter arm may extend around an outside surface of the staple. A center portion of the first adapter arm and the center portion of the second adapter arm may have different configurations. A proximal portion of a first adapter arm and a proximal portion of the second adapter arm may have substantially identical configurations for interfacing with a shackle of a padlock.

For at least one non-limiting implementation, the distal portion of the first adapter arm may define a receiving structure that receives the distal portion of the second adapter arm to provide for mating between the first adapter arm and the second adapter arm. In an alternate example implementation, the distal portion of the second adapter arm may define a receiving structure that receives the distal portion of the first adapter arm to provide for mating between the first adapter arm and the second adapter arm. In some example implementations, a receiving portion of a given adapter arm may be defined as a slot, an opening, a hole, an eye, or other structure into which the distal portion of the other adapter arm may be inserted. In some example implementations, the distal portion of the adapter arm received within the receiving portion of the other adapter arm may have a smaller cross-sectional dimension as compared to the center portion of such adapter arm. In some example implementations, the distal portion of an adapter arm may define an angled portion, bending away from and returning to an axis defined by the center portion of such adapter arm. In some example implementations, the proximal portions of the first adapter arm and the second adapter arm may define a slot, an opening, a hole, an eye, or other structure having an adequate radius through which a shackle of a padlock may pass through.

A first example implementation of a lock adapter 120 is depicted in FIGS. 1A-1D. The lock adapter 120 provides a linkage between a latch assembly 102 mounted on a structure 100 and a padlock 110 that is dimensionally unable to directly interface with the latch assembly 102. The latch assembly 102 is mounted on corresponding members of the structure 100, for example, a door and door frame. The latch assembly 102 includes a staple 104 protruding through a slot in a hasp 108. The hasp 108 may be hinged to pivot over the staple 104 in latched and unlatched positions. The staple 104 defines a shackle aperture 106 for receiving a member of a locking device, typically a shackle 112 of a padlock 110. As noted, in this case, structural or dimensional issues prevent direct interface between the padlock 110 and the latch assembly 102.

The lock adapter 120 may include two components, a first adapter arm 200 and a second adapter arm 300. A first arm proximal portion 232 of the first adapter arm 200 is configured to receive the shackle 112 of the padlock 110. A first arm distal portion 240 of the first adapter arm 200 is configured to pass through the shackle aperture 106 of the staple 104 of the latch assembly 102 and thereby prevent the hasp 108 from being lifted off the staple 104. The first arm distal portion 240 of the first adapter arm 200 is also configured to receive a second arm distal portion 364 of the second adapter arm 300. The first arm proximal portion 232 and the first arm distal portion 240 of the first adapter arm 200 are connected by a first arm central portion 236 as further described below.

A second arm proximal portion 354 of the second adapter arm 300 is also configured to receive the shackle 112 of the padlock 110, and may be designed to have a similar form factor as the first arm proximal portion 232 of the first adapter arm 200. The second arm proximal portion 354 of the second adapter arm 300 may be configured to seat against the first arm proximal portion 232 of the first adapter arm 200 when the lock adapter 120 is engaged with the shackle 112 of the padlock 110. A second arm distal portion 364 of the second adapter arm 300 is configured to be received by and interconnect with the first arm distal portion 240 of the first adapter arm 200 after it passes through the shackle aperture 106 of the staple 104. The second arm proximal portion 354 and the second arm distal portion 364 of the second adapter arm 300 are connected by a second arm central portion 358 that is formed to bend about and around the staple 104 as shown in FIGS. 1A and 1B and as further described below.

FIGS. 2A-2E depict in greater detail the example implementation of the first adapter arm 200 of the example implementation of the lock adapter 120 depicted in FIGS. 1A-1D. As shown, the first adapter arm 200 is generally formed as a straight member along a longitudinal axis. The front and back faces of the first adapter arm 200 may be formed as flat surfaces. The interfaces between the top and bottom edges and the front and back faces of the first adapter arm 200 may be formed as beveled surfaces 206, e.g., to avoid sharp edges while a user is handling the first adapter arm 200. In other example embodiments, the top and bottom surfaces of the first adapter arm 200 may be curved between the front and back faces for the same purpose. The first arm proximal portion 232 defines a first arm first aperture 222 for receipt and acceptance of the shackle 112 of the padlock 110 therethrough. For at least one implementation, the first arm first aperture 222 may be a circular aperture. The edges 224 of the first arm first aperture 222 may also be beveled or curved on both the front and back sides to provide ease of guiding the shackle 112 of the padlock 110 into the first arm first aperture 222.

As depicted, the first arm proximal portion 232 of the first adapter arm 200 may be formed with a first arm circular perimeter 226 having a larger radius than a radius of the first arm first aperture 222, but concentric with the first arm first aperture 222. The first arm circular perimeter 226 of the first arm proximal portion 232 may transition to the first arm central portion 236 of the first adapter arm 200 via a first arm shoulder 228. A width of the first arm central portion 236 between the top and bottom edges may be less than the diameter of the first arm proximal portion 232 as defined by the first arm circular perimeter 226 such that the first arm shoulder 228 acts as a transition between the relative widths of the first arm proximal portion 232 and the first arm central portion 236.

The first arm central portion 236 may be formed as a shank between the first arm proximal portion 232 and the first arm distal portion 240. As shown for at least one implementation of the present disclosure in FIGS. 2A-2E, the cross-sectional form of the first arm central portion 236 extends through to the first arm distal portion 240, maintaining a constant width and thickness of the first adapter arm 200. In some example implementations, the width and thickness of the first arm distal portion 240 may be different than the width and thickness of the first arm central portion 236. The dimensions of the first arm distal portion 240 may generally be selected to ensure compatibility with a variety of sizes of shackle apertures 106 of staples 104. A first arm distal end 218 of the first arm distal portion 240 is formed with a flat end surface. The first arm distal portion 240 further defines a first arm second aperture 210 for receipt of the second arm distal portion 362 of the second adapter arm 300 therethrough. For at least one implementation, the first arm second aperture 210 is formed as an obround or stadium shape and the perimeter edges 212 thereof on the front and back sides may be beveled as shown.

FIGS. 3A-3E depict in greater detail the example implementation of the second adapter arm 300 of the example implementation of the lock adapter 120 depicted in FIGS. 1A-1D. As shown, the second adapter arm 300 is generally formed as an undulating member in the Y-axis with respect to and along a longitudinal X-axis. The front and back faces of the second adapter arm 300 may be formed as smooth surfaces. The interfaces between the top and bottom edges and the front and back faces of the second adapter arm 300 may be formed as beveled surfaces 316, e.g., to avoid sharp edges while a user is handling the second adapter arm 300. In other example embodiments, the top and bottom surfaces of the second adapter arm 300 may be curved between the front and back faces for the same purpose. The second arm proximal portion 354 may be formed as a flat section that defines a second arm first aperture 340 for receipt and acceptance of the shackle 112 of the padlock 110 therethrough. For at least one implementation, the second arm first aperture 340 may be a circular aperture. The edges 342 of the second arm aperture 340 may also be beveled or curved on both the front and back sides to provide ease of guiding the shackle 112 of the padlock 110 into the second arm first aperture 340.

As depicted, the second arm proximal portion 354 of the second adapter arm 300 may be formed with a second arm circular perimeter 344 having a larger radius than a radius of the second arm aperture 340, but concentric with the second arm aperture 340. The second arm circular perimeter 344 may transition to the second arm central portion 358 of the second adapter arm 300 via a second arm shoulder section 228. The second arm central portion 358 may be formed as a bent or undulating shank between the second arm proximal portion 354 and the second arm distal portion 364. A second arm first bend in the shank of the second arm central portion 358 may occur at a second arm first vertex 346, which corresponds to a second arm first interior angle 320 on the back side of the second adapter arm 300. In some example embodiments, the second arm first interior angle 320 may be approximately 45°. In at least one implementation, the second arm first interior angle 320 may have different values, for example, between 35° and 55°.

The second arm central portion 358 of the second adapter arm 300 may further define a second bend at a second arm second vertex 348, which corresponds to a second arm second interior angle 322 on the front side of the second adapter arm 300. In some example embodiments, the second arm second interior angle 322 may be approximately 80°. In at least one implementation, the second arm second interior angle 322 may have different values, for example, between 45° and 90°. The measure of the second arm second interior angle 322 may be selected in conjunction with a depth of the second curve of the bend in the second arm central portion 358 to provide adequate clearance for the second adapter arm 300 over the staple 104 of the latch assembly 102 when the second adapter arm 300 interlocks with the first adapter arm 200 and the lock adapter 120 is installed on the latch assembly 102. A width of the second arm central portion 358 between the top and bottom edges may be less than the diameter of the second arm proximal portion 354 as defined by the second arm circular perimeter 344 such that the second arm shoulder section 228 acts as a transition between the relative widths of the second arm proximal portion 354 and the second arm central portion 358.

As shown for at least one implementation of the present disclosure in FIGS. 3A-3E, the bent shank form of the second arm central portion 358 transitions to the second arm distal portion 364, which is formed as a second arm latch finger 328 with a reduced thickness between the top and bottom edges. The second arm latch finger 328 further bends at a second arm third vertex 350 to form a second arm tip section 366 that is parallel with the second arm proximal portion 354. The second arm third vertex 350 corresponds to a second arm third interior angle 324 on the back side of the second adapter arm 300. In some example embodiments, the second arm third interior angle 324 may be approximately 45°. In at least one implementation, the second arm third interior angle 324 may have different values, for example, between 35° and 55°.

A longitudinal axis of the second arm tip section 366 is offset from a longitudinal axis of the second arm proximal portion 354 such that they lie in different, separated planes as shown, for example, in FIG. 3C. A second arm distal end 318 of the second arm distal portion 364 is formed with a flat surface. The second arm tip section 366 of the second arm latch finger 328 is configured to extend through the first arm second aperture 210 of the first arm distal portion 240 of the first adapter arm 200 as depicted in FIGS. 1C and 1D. The second arm third vertex 350 associated with the bend between the second arm tip section 366 and the remainder of the second arm latch finger 328 creates a "hook" that interfaces with the first arm distal end 218 of the first arm distal portion 240 of the first adapter arm 200, thereby linking and connecting the second arm distal portion 364 of the second adapter arm 300 to the first arm distal portion 240 of the first adapter arm 200.

A second example implementation of a second lock adapter 420 is depicted in FIGS. 4A-4D. The second lock adapter 420 provides a linkage between a second latch assembly 402 mounted on a structure 400 and a padlock 410 that is dimensionally unable to directly interface with the second latch assembly 402. The second latch assembly 402 is mounted on corresponding members of the structure 400, for example, a door and door frame. The second latch assembly 402 includes a staple 404 protruding through a slot in a hasp 408. The hasp 408 may be hinged to pivot over the staple 404 in latched and unlatched positions. The staple 404 defines an eye 406 for receiving a member of a locking device, typically a shackle 412 of a padlock 410. In at least one implementation, structural or dimensional issues may prevent direct interface between the padlock 410 and the second latch assembly 402.

The second lock adapter 420 may include two components, a third adapter arm 500 and a fourth adapter arm 600. A third arm proximal portion 534 of the third adapter arm 500 is configured to receive the shackle 412 of the padlock 410. A third arm distal portion 542 of the third adapter arm 500 is configured to pass through the eye 406 of the staple 404 of the second latch assembly 402 and thereby prevent the hasp 408 from being lifted off the staple 404. The third arm distal portion 542 of the third adapter arm 500 is also configured for insertion into a receiving structure on a fourth arm distal portion 644 of the fourth adapter arm 600. The third arm proximal portion 534 and the third arm distal portion 542 of the third adapter arm 500 are connected by a third arm central portion 538 as further described below.

A fourth arm proximal portion 636 of the fourth adapter arm 600 is also configured to receive the shackle 412 of the padlock 410, and may be designed to have a similar form factor as the third arm proximal portion 534 of the third adapter arm 500. The fourth arm proximal portion 636 of the fourth adapter arm 600 may be configured to seat against the third arm proximal portion 534 of the third adapter arm 500 when the second lock adapter 420 is engaged with the shackle 412 of the padlock 410. A fourth arm distal portion 644 of the fourth adapter arm 600 is configured to receive and interconnect with the third arm distal portion 542 of the third adapter arm 500 after it passes through the eye 406 of the staple 404. The fourth arm proximal portion 636 and the fourth arm distal portion 644 of the fourth adapter arm 600 are connected by a fourth arm central portion 638 that is formed to bend about and around the staple 404 as shown in FIGS. 4A and 4B and as further described below.

FIGS. 5A-5E depict in greater detail the example implementation of the third adapter arm 500 of the example implementation of the second lock adapter 420 depicted in FIGS. 4A-4D. As shown, the third adapter arm 500 is generally formed as a single member that is parallel to the longitudinal X-axis, but is bent with respect to the Y-axis as shown in the figures at a vertex 518 in the third arm central portion 538. The front and back faces of the third adapter arm 500 may be formed as flat surfaces. The interfaces between the top and bottom edges and the front and back faces of the third adapter arm 500 may be formed as beveled surfaces 510, e.g., to avoid sharp edges while a user is handling the third adapter arm 500. In other example embodiments, the top and bottom surfaces of the third adapter arm 500 may be curved between the front and back faces for the same purpose. The third arm proximal portion 534 defines a third arm aperture 526 for receipt and acceptance of the shackle 412 of the padlock 410 therethrough. For at least one implementation, the third arm aperture 526 may include a circular aperture. The edges 530 of the third arm aperture 526 may also be beveled or curved on both the front and back sides to provide ease of guiding the shackle 412 of the padlock 410 into the third arm aperture 526.

As depicted, the third arm proximal portion 534 of the third adapter arm 500 may be formed with a third arm circular perimeter 512 having a larger radius than a radius of the third arm aperture 526, but concentric with the third arm aperture 526. The third arm circular perimeter 512 of the third arm proximal portion 534 may transition to the third arm central portion 538 of the third adapter arm 500 via a third arm shoulder section 514. A width of the third arm central portion 538 between the top and bottom edges may be less than the diameter of the third arm proximal portion 534 as defined by the third arm circular perimeter 512 such that the third arm shoulder section 514 acts as a transition between the relative widths of the third arm proximal portion 534 and the third arm central portion 538.

The third arm central portion 538 may be formed as a bent shank between the third arm proximal portion 534 and the third arm distal portion 542, bending at a third arm vertex 518 within the third arm central portion 538. In some example implementations, the third arm interior angle 520 of the bend of the third arm central portion 538 opposite the third arm vertex 518 may be approximately 150°. In at least one implementation, the third arm interior angle 520 may have different values, for example, between 120° and 160°.

As shown for at least one implementation of the present disclosure in FIGS. 5A-5E, the cross-sectional form of the third arm central portion 538 extends through to the third arm distal portion 542, maintaining a constant width and thickness of the third adapter arm 500. In some example implementations, the width and thickness of the third arm distal portion 542 may be different than the width and thickness of the third arm central portion 538. The dimensions of the third arm distal portion 542 may generally be selected to ensure compatibility with a variety of sizes of eyes 406 of staples 404. A third arm distal end 524 of the third arm distal portion 542 may be formed with a flat end surface.

FIGS. 6A-6E depict in greater detail the example implementation of the fourth adapter arm 600 of the example implementation of the second lock adapter 420 depicted in FIGS. 4A-4D. As shown, the fourth adapter arm 600 is generally formed as an undulating member in the Y-axis with respect to and along a longitudinal X-axis. The front and back faces of the fourth adapter arm 600 may be formed as smooth surfaces. The interfaces between the top and bottom edges and the front and back faces of the fourth adapter arm 600 may be formed as beveled surfaces 616, e.g., to avoid sharp edges while a user is handling the fourth adapter arm 600. In other example embodiments, the top and bottom surfaces of the fourth adapter arm 600 may be curved between the front and back faces for the same purpose. The fourth arm proximal portion 636 may be formed as a flat section that defines a fourth arm first aperture 626 for receipt and acceptance of the shackle 412 of the padlock 410 therethrough. For at least one implementation, the fourth arm first aperture 626 may be a circular aperture. The edges 664 of the fourth arm first aperture 626 may also be beveled or curved on both the front and back sides to provide ease of guiding the shackle 412 of the padlock 410 into the fourth arm first aperture 626.

As depicted, a fourth arm proximal end 614 of the fourth arm proximal portion 636 of the fourth adapter arm 600 may be formed as a circular curve having a larger radius than a radius of the fourth arm first aperture 626, but concentric with the fourth arm first aperture 626. The circular perimeter 344 of the fourth arm proximal portion [354] 636 may transition directly to the fourth arm central portion 638 of the fourth adapter arm 600 such that the diameter of the circular curve of the fourth arm proximal end 614 is congruent with the width of the fourth arm central portion 638. The fourth arm central portion 638 includes a first part 638(1), a second part 638(2), and a third part 638(3).

The fourth arm central portion 638 may be formed as a bent or undulating shank in the Y-axis, including a first portion, second portion and third portion, between the fourth arm proximal portion 636 and the fourth arm distal portion 644. The fourth arm proximal portion 636 may transition to the fourth arm central portion 638 at a fourth arm first vertex 650. The shank of the fourth arm central portion 638 may bend in the same direction at a fourth arm second vertex 652. The fourth arm central portion 638 may transition to the fourth arm distal portion 644 at a fourth arm third vertex 654 forming a recurve bend in an opposite direction from the bends at the fourth arm first vertex 650 and the fourth arm second vertex 652. The inner curve of the bend at the fourth arm first vertex 650 between the fourth arm proximal portion 636 and the fourth arm central portion 638 may be defined by a fourth arm first interior angle 622. In some example embodiments, the fourth arm first interior angle 622 may be approximately 150° such that the bend at the third arm vertex 518 of the third adapter arm 500 and the fourth arm first vertex 650 of the fourth adapter arm 600 are congruent. In at least one implementation, the fourth arm first interior angle 622 may have different values, for example, between 120° and 160°

With this configuration, the third arm proximal portion 534 and a length of the third arm central portion 538 of the third adapter arm 500 and the fourth arm proximal portion 636 and a length of the fourth arm central portion 638 of the fourth adapter arm 600 can nest against each other when attached to the shackle 412 of the padlock 410. The bends at the third arm vertex 518 of the third adapter arm 500 and the fourth arm first vertex 650 of the fourth adapter arm 600 may allow proximal portions 534, 636 of the, respective, third adapter arm 500 and fourth adapter arm 600 of the second lock adapter 420 to extend away from a surface of the structure 400 as shown in FIG. 4A to provide greater clearance for attachment of the padlock 410.

As noted, the shank forming the fourth arm central portion 638 may bend at the fourth arm second vertex 652 and form a fourth arm second interior angle 624. In some example embodiments, the fourth arm second interior angle 624 may be approximately 135°. In at least one implementation, the fourth arm second interior angle 624 may have different values, for example, between 120° and 150°. Opposite the fourth arm third vertex 654 transitioning between the fourth arm central portion 638 and the fourth arm distal portion 644, a fourth arm third interior angle 632 is formed. In some example embodiments, the fourth arm third interior angle 632 may be approximately 90°. In at least one implementation, the fourth arm third interior angle 632 may have different values, for example, between 75° and 115°. The measures of the fourth arm second interior angle 624 and the fourth arm third interior angle 632 may be selected in conjunction with a depth of the inner curve of the bend at the fourth arm third vertex 654 between the fourth arm central portion 638 and the fourth arm distal portion 644 to provide adequate clearance for the fourth adapter arm 600 over the staple 404 of the second latch assembly 402 when the fourth adapter arm 600 interlocks with the third adapter arm 500 and the second lock adapter 420 is installed on the second latch assembly 402.

The fourth arm distal portion 644 further bends toward the fourth arm central portion 638 at a fourth arm fourth vertex 656 to form a fourth arm tip section 646 defining a fourth arm fourth interior angle 634. In some example embodiments, the fourth arm fourth interior angle 634 may be approximately 45°. In at least one implementation, the fourth arm fourth interior angle 634 may have different values, for example, between 35° and 55°. The fourth arm tip section 646 of the fourth arm distal portion 644 further defines a fourth arm second aperture 648 for receipt of the third arm distal portion 542 of the third adapter arm 500 therethrough.

As shown for at least one implementation, the fourth arm second aperture 648 is formed as an obround or stadium shape and the edges 664 thereof on the front and back sides may be beveled as shown. The third arm distal portion 542 of the third adapter arm 500 is angled to extend through the fourth arm second aperture 648 of the fourth arm distal portion 644 of the fourth adapter arm 600 as depicted in FIGS. 4C and 4D. A fourth arm distal end 618 of the fourth arm distal portion 644 may be formed with a flat surface. The fourth arm fourth interior angle 634 between the fourth arm tip section 646 and the remainder of the fourth arm distal portion 644 creates a "hook" that allows the fourth arm second aperture 648 in the fourth arm tip section 646 to interface with the third arm distal end 524 of the third arm distal portion 542 of the third adapter arm 500, thereby linking and connecting the fourth arm distal portion 644 of the fourth adapter arm 600 to the third arm distal portion 542 of the third adapter arm 500.

In some example implementations, the adapter arms are unitarily formed, e.g., by a casting or machining process, of a hardened metal material, such as a boron alloy, a hardened steel, a hardened metal alloy, and the like. In example implementations, the adapter arms may be formed from one-quarter inch (¼") boron hardened steel. In some example implementations, implementation, an aperture in a proximal portion of an adapter arm may be configured to receive a shackle having a diameter of between seven millimeters (7 mm) and ten millimeters (10 mm). Any known or later-arising materials, and combinations thereof, may be used to form the distal, center, and proximal portions of an adapter arm. In some implementations, different materials may be used for the distal, center, and proximal portions of an adapter arm.

A process for securing a structure using a first/second lock adapter 120, 420 configured according to an example implementation of the present disclosure may include a first operation of inserting a first/third adapter arm 200, 500 into a first/second shackle aperture 106, 406 of a staple 104, 404 to secure a hasp 108, 402, and thereby secure a structure. The process may further include a second operation of mating, at respective distal portions thereof, the first/third adapter arm 200, 500 with a second/fourth adapter arm 300, 600. The process may further include mating, at respective proximal portions, the first/third adapter arm 200, 500 and second/fourth adapter arm 300, 600 with a shackle 112, 412 of a padlock 110, 410. The process may further include securing the shackle 112, 412 in a lock body 114, 414 of the padlock 110, 410.

A process for unsecuring a structure 100, 400 secured using a first/second lock adapter 120, 420 according to an implementation of the present disclosure may involve performing the above described operations in a reverse order, such as unsecuring the shackle 112, 412 from the lock body 114, 414, unmating the shackle 112, 412 with the first/third adapter arm 200, 500 and the second/fourth adapter arm 300, 600, unmating the first/third adapter arm 200, 500 from the second/fourth adapter arm 300, 600, and withdrawing the first adapter/third adapter arm 200, 500 from the shackle aperture 106, 406 of the staple 104, 404 to release the hasp 108, 402.

Based on design considerations, the components described above may be of substantially different shape than depicted in the figures, while still operating in the same or an equivalent manner. For example, an implementation of a lock adapter may be taller, shorter, wider, thinner, or of different cross-sectional shape than depicted herein. A number of variations of the examples and implementations described above are possible. In some implementations, one or more fasteners may be eliminated by combining given components as single units. Directional references e.g., upper, lower, inner, outer, upward, downward, left, right, lateral, front, back, top, bottom, above, below, vertical, horizontal, clockwise, counterclockwise, proximal, and distal are used for identification purposes to aid the reader's understanding of the claimed subject matter, and do not create limitations, particularly as to the position, orientation, or use of the lock adapter. Connection references, e.g., attached, coupled, connected, and joined are to be construed broadly and may include intermediate members between a collection of elements and relative movement between elements unless otherwise indicated. As such, connection references do not imply that two elements are directly connected and in fixed relation to each other. The term "or" shall be interpreted to mean "and/or" rather than "exclusive or." Unless otherwise noted in the claims, stated values shall be interpreted as illustrative and shall not be taken to be limiting.

The above specification, examples and drawings provide a complete description of the structure and use of one or more non-limiting implementations of a lock adapter as defined in the claims. Although various implementations of the claimed subject matter have been described above with a given degree of particularity, or with reference to one or more individual implementations, those skilled in the art could make numerous alterations to the disclosed implementations without departing from the spirit or scope of the claimed subject matter. For example, components may be made of many varied materials, and may be colored or patterned for aesthetic purposes or for ease of assembly. Still other implementations are contemplated. It is intended that all matter contained in the above description and shown in the accompanying drawings shall be interpreted as illustrative of particular implementations and not limiting. Changes in detail or structure may be made without departing from the basic elements of the subject matter as defined in the following claims.

What is claimed is:

1. A lock adapter for a lock with a lock shackle comprising:

a first arm comprising:

a first arm central portion;

a first arm distal portion, extending from a first arm distal end, along a first longitudinal axis, to the first arm central portion;

wherein the first arm distal portion has a substantially linear form;

wherein the first longitudinal axis extends along a first axis {X} as represented in a three dimensional space defined by the first axis, a second axis {Y} perpendicular to the first axis and forming a first plane, and a third axis {Z} perpendicular to the first plane;

wherein the first arm distal portion is configured for insertion into and through a staple of a latch assembly of a corresponding hasp configured for use in controlling access to a structure;

a first arm proximal portion, extending on the first plane, from the first arm central portion to a first arm proximal end, and along a second longitudinal axis that extends at a first arm interior angle relative to the first longitudinal axis;

wherein the first arm proximal portion has a substantially linear form;

wherein the first arm proximal portion includes a first arm first aperture providing a first opening configured for receiving the lock shackle;

wherein the first arm central portion seamlessly connects the first arm distal portion with the first arm proximal portion;

wherein the first arm central portion has a substantially non-linear form and includes a first vertex, providing a bend on the first plane and characterized by the first arm interior angle, at which the first longitudinal axis and the second longitudinal axis intersect;

a second arm comprising:

a second arm central portion;

a second arm proximal portion including:

a second arm proximal end;

a second arm first aperture providing a second opening configured for receiving the lock shackle;

wherein the second arm, when used with the first arm to secure the structure, extends from the second arm proximal portion, along the second longitudinal axis, parallel to the first arm proximal portion, to the second arm central portion;

a second arm distal portion, extending from the central portion to a second arm distal end, substantially perpendicularly to the first arm distal portion; and wherein the second arm distal end includes a second arm tip section;

wherein the second arm tip section includes a second arm second aperture;

wherein the second arm second aperture is configured to receive the first arm distal end;

wherein the first arm and second arm further secure the structure upon insertion of the first arm distal end through the staple and into the second arm second aperture;

wherein the second arm central portion seamlessly connects the first arm distal portion with the first arm proximal portion;

wherein the second arm central portion includes a plurality of vertexes which bend the second arm central portion into an elongated “U” shaped form so as to extend up and around the staple when the first arm is mated with the second arm;

wherein, when the first arm is mated with the second arm and used to secure the structure, the first arm distal portion protrudes, at a substantially perpendicular orientation to, through and beyond second arm second aperture so as to prevent separation of the second arm from the first arm while the first arm distal portion protrudes through the staple and the while the first arm and the second arm are mated to the lock shackle; and wherein upon the lock adapter mating with the staple and with the lock shackle, access to the structure via the latch assembly is inhibited.

2. The lock adapter of claim 1, wherein the first arm first aperture is sized to receive the lock shackle therethrough.

3. The lock adapter of claim 2, wherein the second arm first aperture is sized to receive the lock shackle therethrough.

4. The lock adapter of claim 1, wherein the first arm extends along the second longitudinal axis from the first arm distal portion to the first arm central portion; and wherein the first arm extends along the first longitudinal axis from the first arm central portion to the first arm proximal portion;

wherein the first arm is planar with respect to the third axis;

wherein the second arm distal portion proceeds planar to and perpendicular to the first longitudinal axis when mated with the first adapter arm at the first arm distal portion; and wherein the second arm proximal portion proceeds in a substantially parallel orientation to the first arm proximal portion when the lock shackle is inserted into the first arm aperture and the second arm first aperture.

5. The lock adapter of claim 1, wherein the first arm central portion includes a first arm vertex at which the first arm central portion bends at the first arm interior angle;

wherein the second arm extends along the second longitudinal axis from the second arm proximal portion to a second arm first vertex at which the second arm bends and forms a second arm first interior angle; and wherein the first arm interior angle is the same as the second arm first interior angle.

6. The lock adapter of claim 5, wherein the second arm central portion includes:

a second arm central portion first part; and a second arm second vertex;

wherein the second arm second vertex bends the second arm central portion at a second arm second interior angle; and wherein the second arm central portion first part extends from the second arm first vertex in a linear form at the second arm second vertex.

7. The lock adapter of claim 6, wherein the second arm central portion first part is substantially parallel to a portion of the first arm distal portion when the first arm is mated with the second arm to secure the structure.

8. The lock adapter of claim 7, wherein the first arm first interior angle and the second arm first interior angle are substantially one-hundred and fifty degrees; and wherein the second arm second interior angle is substantially one-hundred and thirty-five degrees.

9. The lock adapter of claim 6, wherein the second arm central portion includes:

a second arm third vertex;

wherein the second arm third vertex bends the second arm central portion at a second arm third interior angle; and a second arm central portion second part;

wherein the second arm central portion second part extends from the second arm second vertex to the second arm third vertex; and wherein the second arm central portion second part is oriented so as to extend away from the first arm distal portion and the staple when the first arm is mated with the second arm to secure the structure.

10. The lock adapter of claim 9, wherein the first arm first interior angle and the second arm first interior angle are substantially one-hundred and fifty degrees;

wherein the second arm second interior angle is substantially one-hundred and thirty-five degrees; and wherein the second arm third interior angle is substantially ninety degrees.

11. The lock adapter of claim 9, wherein the second arm central portion includes:

a second arm fourth vertex;

wherein the second arm fourth vertex bends the second arm central portion, at a second arm fourth interior angle; and a second arm central portion third part;

wherein the second arm central portion third part extends from the second arm third vertex to the second arm fourth vertex; and wherein the second arm central portion third part is oriented so as to extend towards the first arm distal portion when the first arm is mated with the second arm to secure the structure.

12. The lock adapter of claim 11, wherein the first arm first interior angle and the second arm first interior angle are substantially one-hundred and fifty degrees;

wherein the second arm second interior angle is substantially one-hundred and thirty-five degrees;

wherein the second arm third interior angle is substantially ninety degrees; and wherein the second arm fourth interior angle is substantially forty-five degrees.

13. The lock adapter of claim 6, wherein the second arm central portion includes:

a second arm central portion first part;

a second arm central portion second part;

a second arm central portion third part;

a second arm second vertex; and a second arm third vertex;

wherein the second arm central portion second part is seamlessly connected, by the second arm second vertex, to the second arm central portion first part; and wherein the second arm central portion third part is seamlessly connected, by a second arm third vertex, to the second arm central portion second part.

14. The lock adapter of claim 13, wherein the second arm central portion second part and the second arm central portion third part collectively form substantially a "V" shape.

15. The lock adapter of claim 13, wherein, when the first arm is mated with the second arm to secure the structure:

the second arm central portion first part is configured to be substantially parallel to the first arm distal portion.

16. The lock adapter of claim 15, wherein, when the first arm is mated with the second arm to secure the structure:

the second arm central portion second part is oriented away from the first arm distal portion.

17. The lock adapter of claim 15, wherein, when the first arm is mated with the second arm to secure the structure:

the second arm central portion third part extends on an orientation that is towards the first arm distal end.

18. The lock adapter of claim 15, wherein the second arm central portion includes:

a second arm fourth vertex; and wherein the second arm central portion is seamlessly connected to the second arm distal portion by the second arm fourth vertex.

19. The lock adapter of claim 18, wherein the second arm fourth vertex is formed at a second arm fourth interior angle of substantially forty-five degrees.

20. The lock adapter of claim 18, wherein the first arm first interior angle is formed at substantially one-hundred and fifty degrees;

wherein the second arm first vertex is formed at a second arm first interior angle of substantially one-hundred and fifty degrees;

wherein the second arm second vertex is formed at a second arm second interior angle of substantially one-hundred and thirty-five degrees;

wherein the second arm third vertex is formed at second arm third interior angle of substantially ninety degrees; and wherein the second arm fourth vertex is formed at a second arm fourth interior angle of substantially forty-five degrees.

* * * * *